United States Patent
Heo et al.

(10) Patent No.: US 12,517,817 B2
(45) Date of Patent: Jan. 6, 2026

(54) MEMORY DEVICE FOR PROCESSING IN MEMORY AND OPERATING METHOD OF MEMORY DEVICE

(71) Applicant: Samsung Electronics Co., Ltd., Suwon-si (KR)

(72) Inventors: Jaeyoung Heo, Seoul (KR); Byeongho Kim, Suwon-si (KR); Yuhwan Ro, Suwon-si (KR); Sungjoo Yoo, Seoul (KR); Suk Han Lee, Suwon-si (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 18/515,565

(22) Filed: Nov. 21, 2023

(65) Prior Publication Data
US 2024/0330171 A1    Oct. 3, 2024

(30) Foreign Application Priority Data

Mar. 29, 2023 (KR) .................. 10-2023-0041484

(51) Int. Cl.
G06F 12/02 (2006.01)
(52) U.S. Cl.
CPC ................... *G06F 12/023* (2013.01)
(58) Field of Classification Search
None
See application file for complete search history.

(56) References Cited

U.S. PATENT DOCUMENTS

| | | | |
|---|---|---|---|
| 8,555,037 B2 | 10/2013 | Gonion | |
| 8,666,322 B1 | 3/2014 | Bradley et al. | |
| 9,392,479 B2 | 7/2016 | Kim et al. | |
| 9,904,512 B1* | 2/2018 | Pasca | G06F 7/483 |
| 10,996,959 B2 | 5/2021 | Morad et al. | |
| 11,663,008 B2 | 5/2023 | Lee et al. | |
| 2019/0266485 A1* | 8/2019 | Singh | G06F 9/3001 |
| 2021/0110235 A1* | 4/2021 | Hoang | G06F 17/15 |
| 2021/0209455 A1* | 7/2021 | Song | G06F 3/061 |
| 2021/0365334 A1 | 11/2021 | Sity et al. | |
| 2022/0351765 A1* | 11/2022 | Song | G06F 7/5443 |
| 2024/0134601 A1* | 4/2024 | Agrawal | G06F 7/483 |

FOREIGN PATENT DOCUMENTS

KR    20200108768 A    9/2020

* cited by examiner

*Primary Examiner* — Stephanie Wu
(74) *Attorney, Agent, or Firm* — Wolf, Greenfield & Sacks, P.C.

(57) ABSTRACT

Disclosed is a memory device which includes a plurality of memory chips. Each of the plurality of memory chips includes a plurality of memory banks and a logic circuit. In a first operation mode, the logic circuit writes first data in the plurality of memory banks based on a first command and a first address received from the host, and performs a first processing-in-memory (PIM) operation based on third data received from the host and the first data. In a second operation mode, the logic circuit writes second data in the plurality of memory banks based on the first command and the first address received from the host, and performs a second PIM operation based on fourth data different from the third data received from the host and the second data.

20 Claims, 21 Drawing Sheets

MEMORY DEVICE FOR PROCESSING IN MEMORY AND OPERATING METHOD OF MEMORY DEVICE

CROSS-REFERENCE TO RELATED APPLICATIONS

This application claims priority under 35 U.S.C. § 119 to Korean Patent Application No. 10-2023-0041484 filed on Mar. 29, 2023, in the Korean Intellectual Property Office, the disclosures of which are incorporated by reference herein in their entireties.

BACKGROUND

Embodiments of the present disclosure described herein relate to a semiconductor device, and more particularly, relate to a memory device performing a processing-in-memory operation based on a vector input or a scalar input and an operating method of the memory device.

A random access memory directly performs some of calculations of a central processing unit, which is called a processing-in-memory (PIM). Since the random access memory directly performs some calculations, the communication between the central processing unit and the random access memory may decrease, and the bottleneck may be eliminated.

To perform a PIM operation, the random access memory may receive a vector input from a host. When the random access memory receives only the vector input, because the random access memory is incapable of performing an accumulation operation between a plurality of elements included in the vector input, the host may perform the accumulation operation between the plurality of elements. In this case, the amount of data communication between the random access memory and the host may increase.

SUMMARY

Embodiments of the present disclosure provide a memory device performing a PIM operation based on vector data or performing a PIM operation only on partial scalar data among scalar data received from a host through a zero-check and an operating method of the memory device.

According to some embodiments, a memory device includes a plurality of memory chips. Each of the plurality of memory chips includes a plurality of memory banks, each of which includes a memory cell array including a plurality of memory cells electrically connected to a plurality of word lines, a row decoder electrically connected to the memory cell array by the plurality of word lines, and a sense amplifier and write driver electrically connected to the memory cell array by a plurality of bit lines, and a logic circuit electrically connected to the plurality of memory banks and reading or writing data from or to the plurality of memory banks based on a plurality of respective commands and a plurality of respective addresses received from a host. In a first operation mode, the logic circuit writes first data in the plurality of memory banks based on a first command and a first address received from the host, and is configured to perform a first processing-in-memory (PIM) operation based on third data received from the host and the first data. In a second operation mode, the logic circuit writes second data in the plurality of memory banks based on the first command and the first address received from the host, and is configured to perform a second PIM operation based on fourth data different from the third data received from the host and the second data.

According to some embodiments, an operating method of a memory device which includes a plurality of memory chips each including a plurality of memory cells includes causing, in a first operation mode, a logic circuit included in the memory device to perform operations including recording first data at the plurality of memory cells based on a first command and a first address received from a host and to performing a first PIM operation based on third data received from the host and the first data read based on a second command and a second address received from the host, and causing, in a second operation mode, the logic circuit to perform operations including recording second data at the plurality of memory cells based on the first command and the first address, generating an index when fourth data are received from the host, generating a weight address based on the index in response to the second command and the second address, and performing a second PIM operation based on the fourth data and the second data read in response to the second command and the weight address.

According to some embodiments, an operating method of a memory device which includes a plurality of memory chips each including a plurality of memory cells includes causing, in a first operation mode, a logic circuit included in the memory device to perform operations including recording first data at the plurality of memory cells based on a first command and a first address received from a host, and performing a first PIM operation based on third data received from the host and the first data read in response to a second command and a second address received from the host, and causing, in a second operation mode, the logic circuit to perform operations including recording second data at the plurality of memory cells based on the first command and the first address, receiving fourth data from the host, generating an index when the fourth data include a non-zero value, generating a weight address based on the index in response to the second command and the second address, and performing a second PIM operation based on the fourth data and the second data read in response to the second command and the weight address.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure will be described in detail and clearly to such an extent that an ordinary one in the art easily carries out the present disclosure.

Figure 1:
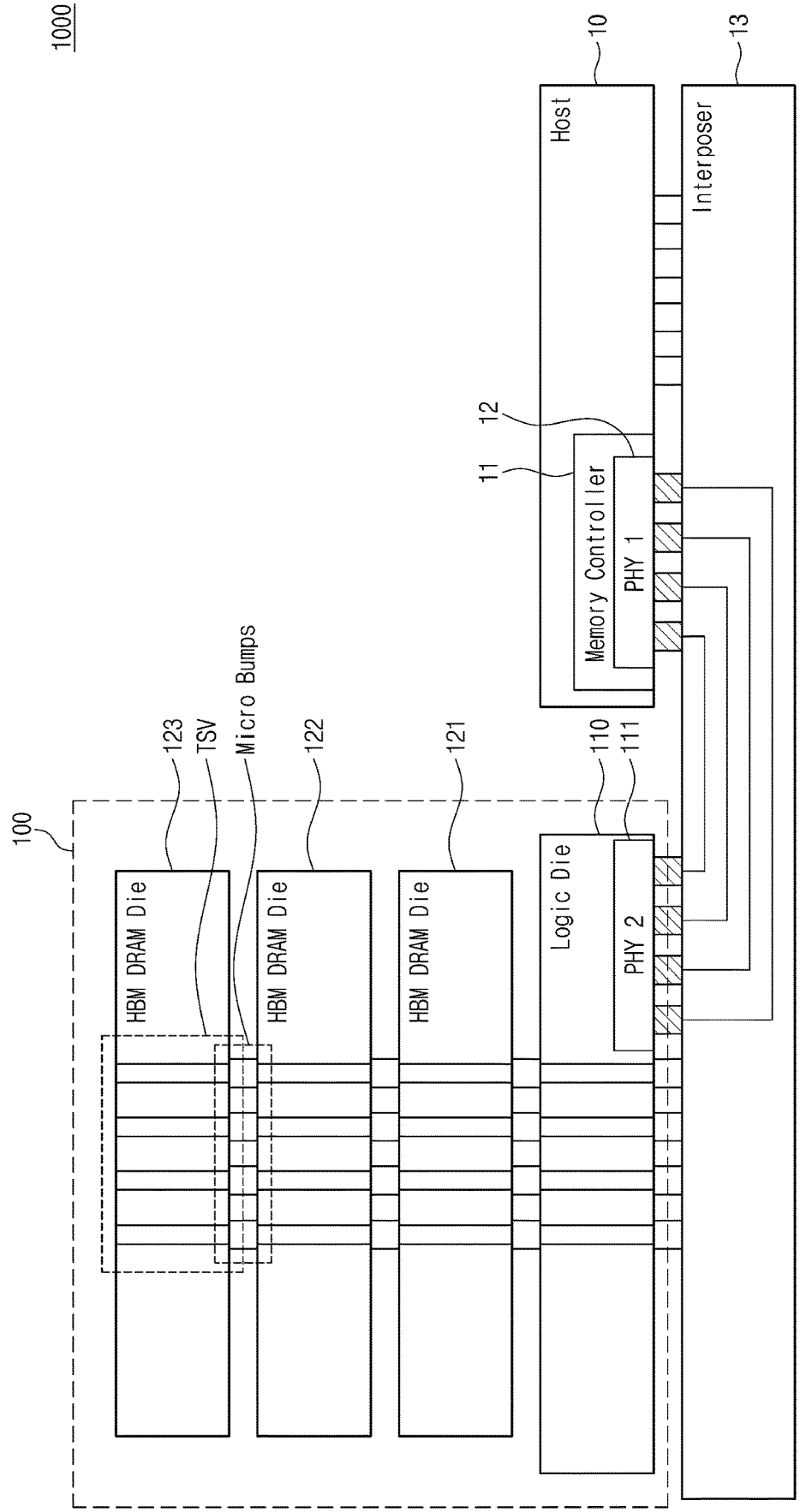
FIG. 1 is a block diagram illustrating an electronic device according to some embodiments of the present disclosure.

FIG. 1 is a block diagram illustrating an electronic device 1000 according to some embodiments of the present disclosure. Referring to FIG. 1, the electronic device 1000 may include a memory device 100, a host 10, a memory controller 11, and an interposer 13.

The memory device 100 may include first to third memory dies (HBM DRAM Dies) 121 to 123 and a logic die 110. The first to third memory dies 121 to 123 may be sequentially stacked on the logic die 110 in a vertical direction.

The first to third memory dies 121 to 123 and the logic die 110 may be electrically connected to each other through micro bumps and through silicon vias (TSV) arranged in a matrix form. However, locations of the through silicon vias and the micro bumps are not limited to the example illustrated in FIG. 1.

The first to third memory dies 121 to 123 may be manufactured with the same or similar structure/configuration. An example in which the number of memory dies included in the memory device 100 is 3 is illustrated in FIG. 1, but the number of memory dies is not limited thereto. In some embodiments, a memory die may be also referred to as a "core die" or a "slave die", and a die may be also referred to as a "chip".

The logic die 110 may communicate with a device located outside the memory device 100. For example, the device may be the host 10. In some embodiments, the host 10 may be referred to as a "system on chip (SoC)". The logic die 110 may include a second physical layer (PHY2) 111 electrically connected to the host 10 and may communicate with the host 10 based on the second physical layer 111.

The logic die 110 may provide an address and data transmitted from the host 10 to the first to third memory dies 121 to 123. The logic die 110 may receive data from the first to third memory dies 121 to 123.

The logic die 110 may provide an interface between the first to third memory dies 121 to 123 and the host 10. The logic die 110 may be referred to as an "interface die", a "master die", or a "buffer die".

The memory device 100 may be a general-purpose DRAM device such as a DDR SDRAM (Double Data Rate Synchronous Dynamic Random Access Memory), a DDR2 SDRAM, a DDR3 SDRAM, a DDR4 SDRAM, or a DDR5 SDRAM. The memory device 100 may be a mobile DRAM device such as an LPDDR (Low Power Double Data Rate) SDRAM, an LPDDR2 SDRAM, an LPDDR3 SDRAM, an LPDDR4 SDRAM, an LPDDR4X SDRAM, or an LPDDR5 SDRAM. However, the memory device 100 illustrated in FIG. 1 is not limited thereto.

The host 10 may include a processor (not illustrated) capable of performing various operations (or calculations) for the purpose of an application that the electronic device 1000 supports. For example, the host 10 may include at least one of a CPU (Central Processing Unit), an ISP (Image Signal Processing Unit), a DSP (Digital Signal Processing Unit), a GPU (Graphics Processing Unit), a VPU (Vision Processing Unit), and an NPU (Neural Processing Unit).

The host 10 may include the memory controller 11 and a first physical layer (PHY 1) 12 electrically connected to the logic die 110 and may communicate with the logic die 110 based on the first physical layer 12. The host 10 may store data for processing in the memory device 100 or may read data for processing from the memory device 100. However, a location of the memory controller 11 is not limited to the example illustrated in FIG. 1.

The interposer 13 may connect the memory device 100 and the host 10. In detail, the interposer 13 may provide physical paths that connect the memory device 100 and the host 10 and are formed by using conductive materials for electrical connection. For example, the interposer 13 may be a silicon interposer. However, the interposer 13 illustrated in FIG. 1 is not limited thereto.

Figure 2:
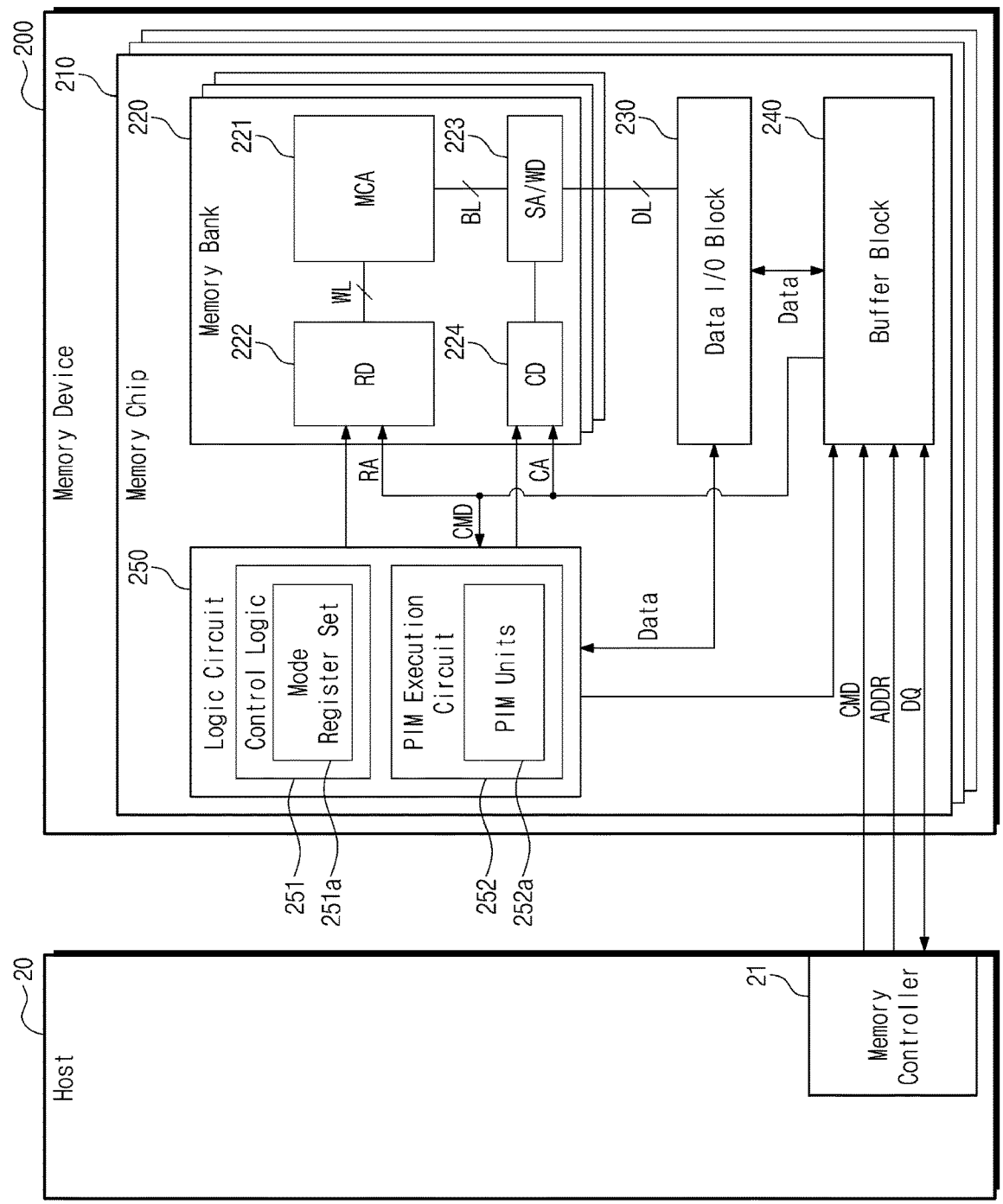
FIG. 2 is a diagram illustrating a configuration of a memory device in an electronic device in detail.

FIG. 2 is a diagram illustrating a configuration of a memory device 200 in an electronic device 2000 in detail. In some embodiments, the memory device 200 may correspond to one HBM DRAM die 121. Referring to FIG. 2, the electronic device 2000 may include a host 20, a memory controller 21, and the memory device 200.

The host 20 including the memory controller 21 may transmit a command CMD and address ADDR to the memory device 200. In some embodiments, the host 20 may transmit the command CMD and the address ADDR to the memory device 200 through the memory controller 21. The host 20 including the memory controller 21 may exchange a data signal DQ with the memory device 200. The data signal DQ transferred from the host 20 to the memory device 200 may include weights to be programmed in the memory device 200.

In the specification, below, the description will be given as the host 20 including the memory controller 21 transmits the command/address signals CMD/ADDR to the memory device 200.

For example, the host 20 may transmit a write command, address and the data signal DQ to the memory device 200. The memory device 200 may record data at memory cells corresponding to the write command and address received from the host 20.

For example, the host 20 may transmit a read command and address to the memory device 200. The memory device 200 may transmit data, which are read from memory cells corresponding to the read command and address received from the host 20, to the host 20 as the data signal DQ.

For example, the host 20 may store a PIM instruction set PIMIS in the memory device 200 before transmitting the read command and address to the memory device 200. The PIM instruction set PIMIS may include at least one of various setting commands defined by the standard. The PIM instruction set PIMIS may include information about an operator and registers.

The information included in the PIM instruction set PIMIS will be described in detail later. In the specification, below, the description will be given as the PIM instruction set PIMIS is stored in the memory device 200.

The memory device 200 may perform a PIM operation based on the command and address (CMD, ADDR) received from the host 20. A configuration performing the PIM operation will be described in detail later.

The memory device 200 may be a dynamic random access memory (DRAM), but the present disclosure is not limited thereto. The memory device 200 may be one of various random access memories such as an SRAM (Static Random Access Memory), an MRAM (Magnetic RAM), a PRAM (Phase-change RAM), an FRAM (Ferroelectric RAM), and an RRAM (Resistive RAM).

The memory device 200 may include a plurality of memory chips. However, for convenience, the description will be given based on one memory chip 210. The remaining memory chips that are not disclosed may include the same components as the memory chip 210.

The memory chip 210 may include a plurality of memory banks 220, a data input/output block 230, a buffer block 240, and a logic circuit 250. Each of the plurality of memory banks 220 may include a memory cell array 221, a row decoder 222, a sense amplifier and write driver 223, and a column decoder 224.

The memory cell array 221 may include a plurality of memory cells (not illustrated) arranged in a row direction and a column direction. Each of the plurality of memory cells may be connected to one of a plurality of word lines WL and one of a plurality of bit lines BL.

The row decoder 222 may operate under control of the logic circuit 250. The row decoder 222 may activate a word line selected as an access target from among the plurality of word lines WL based on the command CMD and the row address RA.

The sense amplifier and write driver 223 may operate under control of the logic circuit 250. The sense amplifier and write driver 223 may be connected to the plurality of memory cells through the plurality of bit lines BL.

The column decoder 224 may operate under control of the logic circuit 250. The column decoder 224 may be connected to the sense amplifier and write driver 223. The column decoder 224 may select one or more of the plurality of bit lines BL based on the command CMD and the column address CA.

The data input/output block 230 may operate under control of the logic circuit 250. The data input/output block 230 is connected to the sense amplifier and write driver 223 through a plurality of data lines DL. The data input/output block 230 may output the data read by the sense amplifier and write driver 223 to the buffer block 240 depending on the column address CA.

The data input/output block 230 may provide the data received from the buffer block 240 to the sense amplifier and write driver 223, based on the column address CA.

The buffer block 240 may operate under control of the logic circuit 250. The buffer block 240 may exchange data with the data input/output block 230. The buffer block 240 may receive the command and address (CMD, ADDR) from the host 20. The buffer block 240 may exchange the data signal DQ with the host 20.

The logic circuit 250 may include control logic 251 and a processing in-memory (PIM) execution unit 252.

The control logic 251 may include a mode register set 251a. The mode register set 251a may include information about a mode that is set by the host 20.

For example, the mode register set 251a may include information about an operation mode of the memory chip 210. The information about the operation mode may include a first PIM operation mode for a vector input and a second PIM operation mode for a scalar input. However, the information included in the mode register set 251a is not limited thereto. Configurations associated with the first PIM operation mode and the second PIM operation mode will be described in detail later.

The PIM execution unit 252 may include a plurality of PIM units 252a. Each of the plurality of PIM units 252a may execute a PIM command corresponding to the PIM instruction set PIMIS based on the command CMD and data received from the host 20. In some embodiments, the data may include a vector input and a scalar input.

The plurality of PIM units 252a may execute the PIM command by performing the first PIM operation or the second PIM operation based on the information about the operation mode of the mode register set 251a.

The control logic 251 may allow the PIM execution unit 252 to execute the PIM command corresponding to the PIM instruction set PIMIS. A configuration executing the PIM command will be described in detail later.

Figure 3:
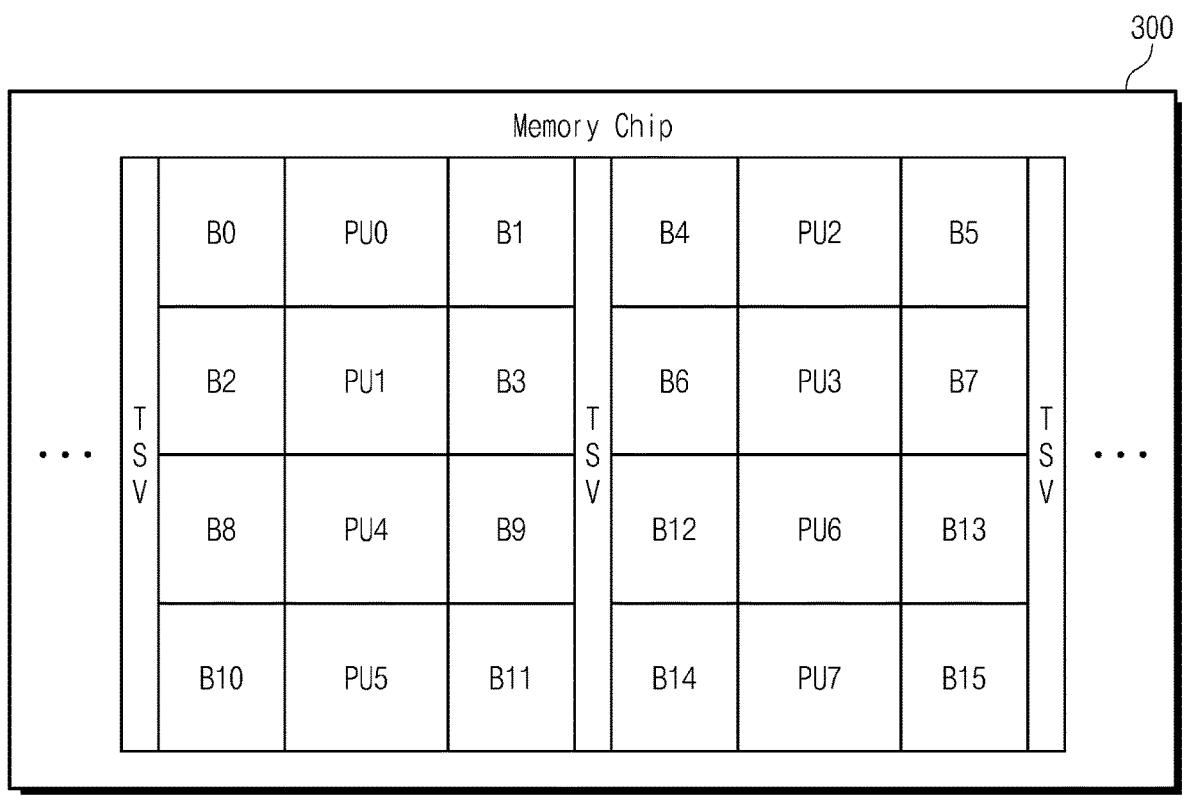
FIG. 3 is a diagram illustrating arrangements of a plurality of banks and a plurality of PIM units in one memory chip.

FIG. 3 is a diagram illustrating arrangements of a plurality of banks and a plurality of PIM units in one memory chip 300. In some embodiments, the memory chip 300 of FIG. 3 may correspond to the memory chip 210 of FIG. 2.

Referring to FIG. 3, the memory chip 300 may include a plurality of memory banks B0 to B15 and a plurality of PIM units PU0 to PU7. In some embodiments, the plurality of memory banks B0 to B15 of FIG. 3 may correspond to the memory banks 220 of FIG. 2. The plurality of PIM units PU0 to PU7 of FIG. 3 may correspond to the plurality of PIM units 252a of FIG. 2.

The plurality of memory banks B0, B2, B8, and B10 may be electrically connected to other memory banks not illustrated through the through silicon vias TSV. The plurality of memory banks B1, B3, B9, and B11 may be electrically connected to the plurality of memory banks B4, B6, B12, and B14 through the through silicon vias TSV.

The plurality of memory banks B5, B7, B13, and B15 may be electrically connected to other memory banks not illustrated through the through silicon vias TSV. However, locations of the through silicon vias TSV is not limited to the example illustrated in FIG. 3.

The first PIM unit PU0 may be disposed between the first memory bank B0 and the second memory bank B1. The second PIM unit PU1 may be disposed between the third memory bank B2 and the fourth memory bank B3. The fifth PIM unit PU4 may be disposed between the ninth memory bank B8 and the second memory bank B9. The sixth PIM unit PU5 may be disposed between the 11st memory bank B10 and the 12nd memory bank B11.

The third PIM unit PU2 may be disposed between the fifth memory bank B4 and the sixth memory bank B5. The fourth PIM unit PU3 may be disposed between the seventh memory bank B6 and the eighth memory bank B7. The seventh PIM unit PU6 may be disposed between the 13th memory bank B12 and the 14th memory bank B13. The eighth PIM unit PU7 may be disposed between the 15th memory bank B14 and the 16th memory bank B15. However, locations of the plurality of PIM units PU0 to PU7 are not limited to the example illustrated in FIG. 3.

Figure 4:
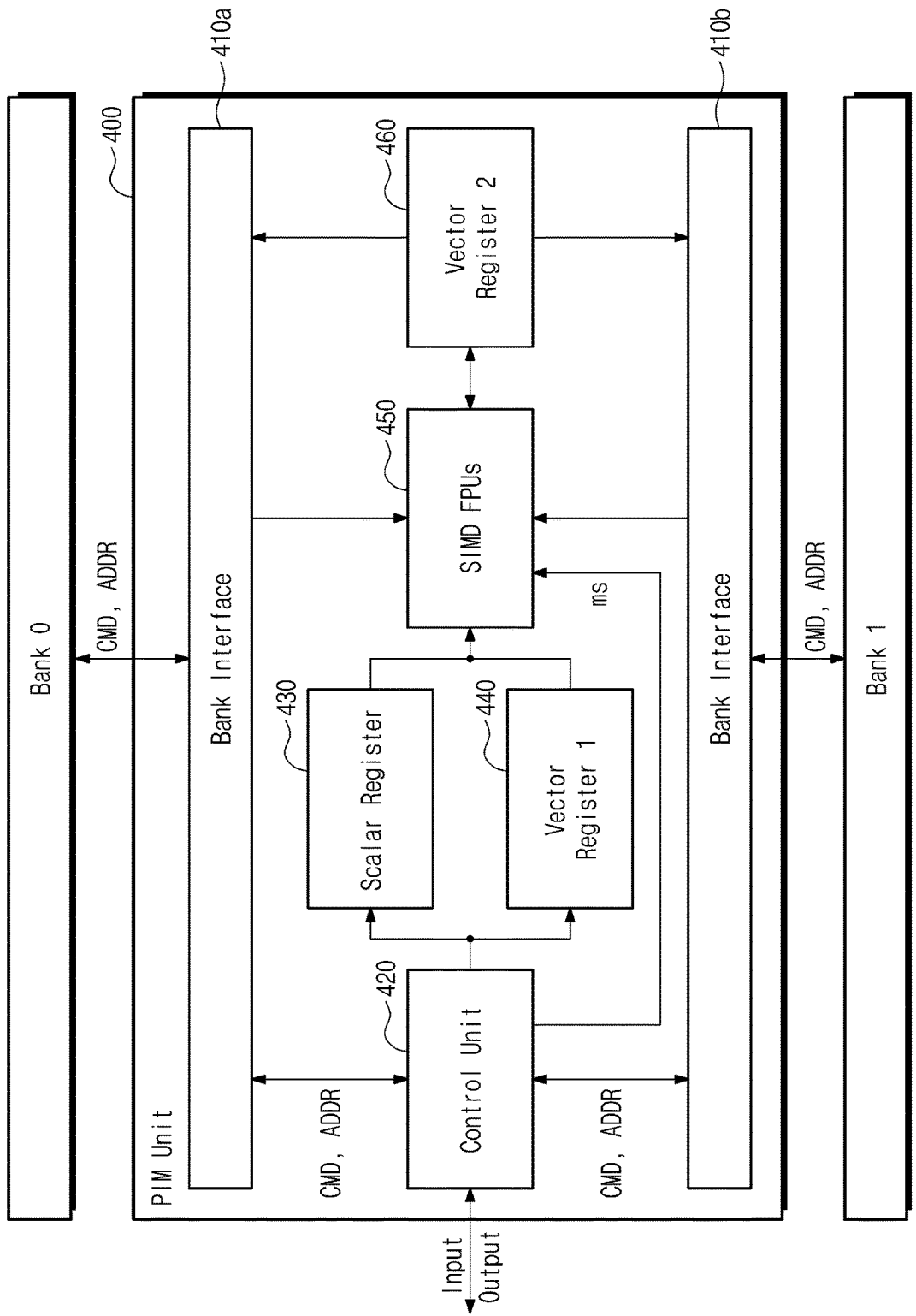
FIG. 4 is a diagram illustrating a configuration of a PIM unit connected to a plurality of memory banks in detail.

FIG. 4 is a diagram illustrating a configuration of a PIM unit 400 connected to a plurality of memory banks, bank 0 and bank 1, in detail. In some embodiments, the plurality of memory banks, bank 0 and bank 1, of FIG. 4 may correspond to the first memory bank B0 and the second memory bank B1 of FIG. 3. Accordingly, the PIM unit 400 of FIG. 4 may correspond to the first PIM unit PU0 of FIG. 3.

Referring to FIG. 4, the PIM unit 400 may include bank interfaces 410a and 410b, a control unit 420, a scalar register 430, a first vector register 440, a single-instruction multiple-data floating point units (SIMD FPUs) 450, and a second vector register 460.

The bank interfaces 410a and 410b may provide communications between the PIM unit 400 and the plurality of memory banks, bank 0 and bank 1, not included in the PIM unit 400.

The PIM unit 400 may communicate with the first memory bank, bank 0, through the bank interface 410a. The PIM unit 400 may transmit the command and address (CMD, ADDR) to the first memory bank, bank 0.

For example, when the command CMD is the write command, the PIM unit 400 may store data in the first memory bank, bank 0. In some embodiments, the data may be weights. For example, when the command CMD is the read command, the PIM unit 400 may read data from the first memory bank, bank 0. In some embodiments, the data may be PIM operation results.

The PIM unit 400 may communicate with the second memory bank, bank 1, through the bank interface 410b. The PIM unit 400 may transmit the command and address (CMD, ADDR) to the second memory bank, bank 1.

For example, when the command CMD is the write command, the PIM unit 400 may store data in the second memory bank, bank 1. In some embodiments, the data may be weights. For example, when the command CMD is the read command, the PIM unit 400 may read data from the second memory bank, bank 1. In some embodiments, the data may be PIM operation results.

The control unit 420 may control the components of the PIM unit 400 and the plurality of memory banks, bank 0 and bank 1, based on the command and address (CMD, ADDR).

The control unit 420 may receive input data and may store the input data in the scalar register 430 or the first vector register 440. When the input data is the vector input, the control unit 420 may store the vector input in the first vector register 440. When the input data is the scalar input, the control unit 420 may store the scalar input in the scalar register 430.

The SIMD FPUs 450 may operate under control of the control unit 420. That is, the SIMD FPUs 450 may operate in the first PIM operation mode or the second PIM operation mode in response to a mux signal ms received from the control unit 420. The mux signal ms may include information about a mode of the PIM unit 400, which is set by an external host.

The SIMD FPUs 450 may perform a first operation based on data received from the first vector register 440 and data read from the first memory bank, bank 0. Likewise, the SIMD FPUs 450 may perform the first operation based on data received from the first vector register 440 and data read from the second memory bank, bank 1.

In some embodiments, the SIMD FPUs 450 may perform a second operation based on data received from the scalar register 430 and data read from the first memory bank, bank 0. Likewise, the SIMD FPUs 450 may perform the second operation based on data received from the scalar register 430 and data read from the second memory bank, bank 1.

The second vector register 460 may store a result of the first operation or the second operation performed by the SIMD FPUs 450. When the first operation or the second operation is performed by the SIMD FPUs 450, in the case where data are stored in the second vector register 460, the second vector register 460 may output the stored data to the SIMD FPUs 450.

The SIMD FPUs 450 may perform a third operation based on the result of the first operation and the stored data. The SIMD FPUs 450 may output a result of the third operation to the second vector register 460. The second vector register 460 may store the result of the third operation. The result of the first operation may be updated with the result of the third operation. The first PIM operation may be defined as including the first operation and the third operation. The first PIM operation will be described in detail later.

The SIMD FPUs 450 may perform a fourth operation based on the result of the second operation and the stored data. The SIMD FPUs 450 may output a result of the fourth operation to the second vector register 460. The second vector register 460 may store the result of the fourth operation. The result of the second operation may be updated with the result of the fourth operation. The second PIM operation may be defined as including the second operation and the fourth operation. The second PIM operation will be described in detail later.

The PIM unit 400 may store data (i.e., the result of the third operation or the fourth operation) output from the second vector register 460 in the first memory bank, bank 0, and the second memory bank, bank 1, in response to the command and address (CMD, ADDR). The PIM unit 400 may output the data stored in the first memory bank, bank 0, and the second memory bank, bank 1, as output data that is output in response to the command and address (CMD, ADDR).

Figure 5:
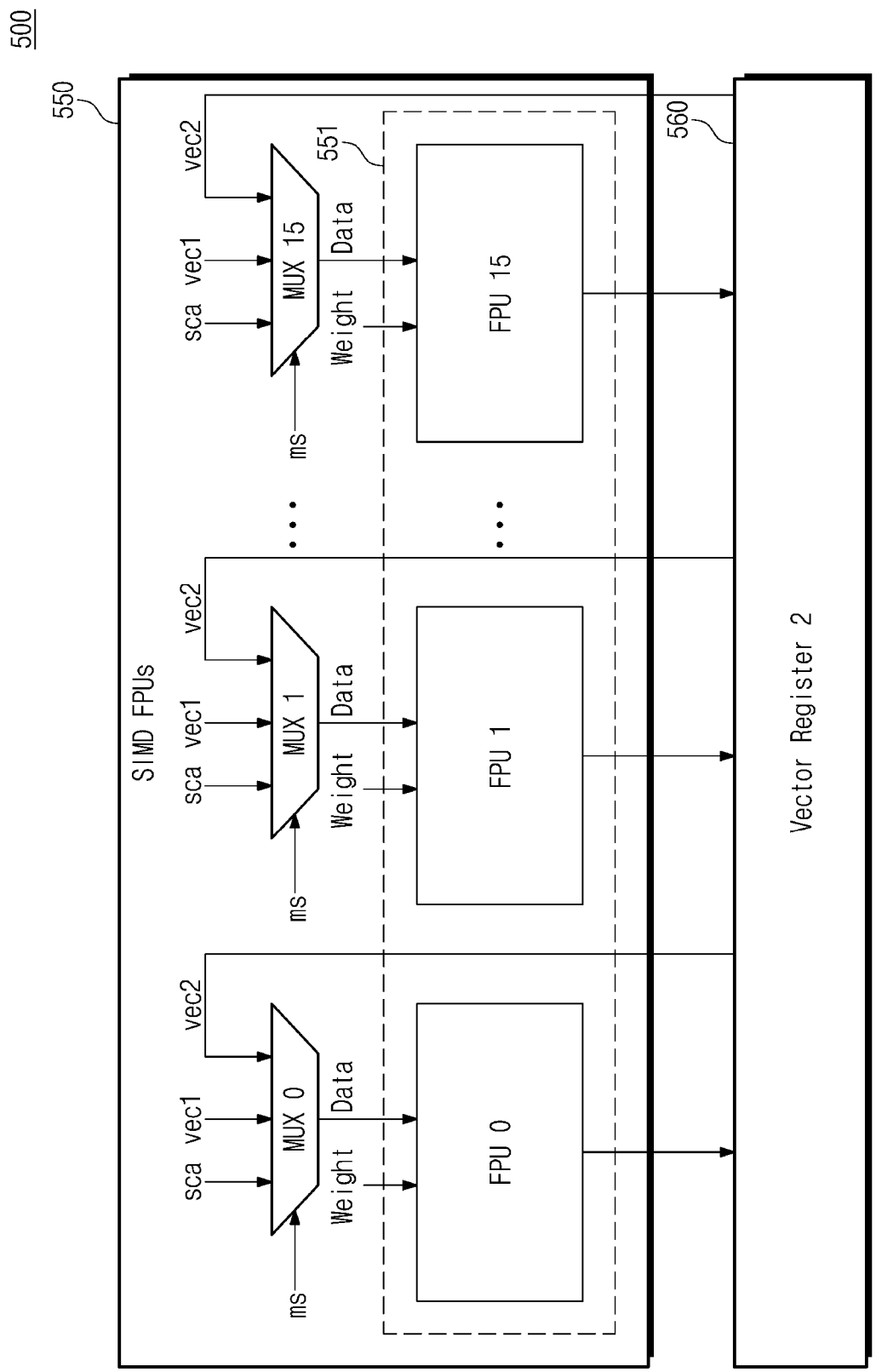
FIG. 5 is a diagram illustrating a configuration of a single-instruction multiple-data floating point units (SIMD FPUs) included in a PIM unit in detail.

FIG. 5 is a diagram illustrating a configuration of a single-instruction multiple-data floating point units (SIMD FPUs) 550 included in a PIM unit 500 in detail.

Referring to FIGS. 4 and 5, the SIMD FPUs 550 may include a plurality of multiplexers MUX 0 to MUX 15 and a plurality of devices (FPU 0 to FPU 15) 551. Data selected by the plurality of multiplexers MUX 0 to MUX 15 may be respectively transmitted to the plurality of plurality of devices 551. However, the number of multiplexers and the number of devices are not limited thereto.

The first multiplexer MUX 0 may select one of data sca, vec1, or vec2 based on the mux signal ms. The first multiplexer MUX 0 may transmit the selected data "data" to the first device FPU 0. The data sca may be scalar data output from the scalar register 430. The data vec1 may be vector data output from the first vector register 440. The data vec2 may be vector data output from a second vector register 560.

The first device FPU 0 may perform the first operation based on a weight "weight" read from a memory bank and the vector data vec1. The first device FPU 0 may perform the second operation based on a weight "weight" read from a memory bank and the scalar data sca.

When the vector data vec2 are selected by the first multiplexer MUX 0, the first device FPU 0 may perform the third operation based on a result of the first operation and the vector data vec2. In this case, the vector data vec2 may include the result of the first operation previously performed.

In some embodiments, when the vector data vec2 are selected by the first multiplexer MUX 0, the first device FPU 0 may perform the fourth operation based on a result of the second operation and the vector data vec2. In this case, the vector data vec2 may include the result of the second operation previously performed.

The first device FPU 0 may output a result of the third operation or the fourth operation to the second vector register 560.

Likewise, the remaining multiplexers MUX 1 to MUX 15 may operate to be identical or similar to the first multiplexer MUX 0. The remaining devices FPU 1 to FPU 15 may operate to be identical or similar to the first device FPU 0.

Figure 6:
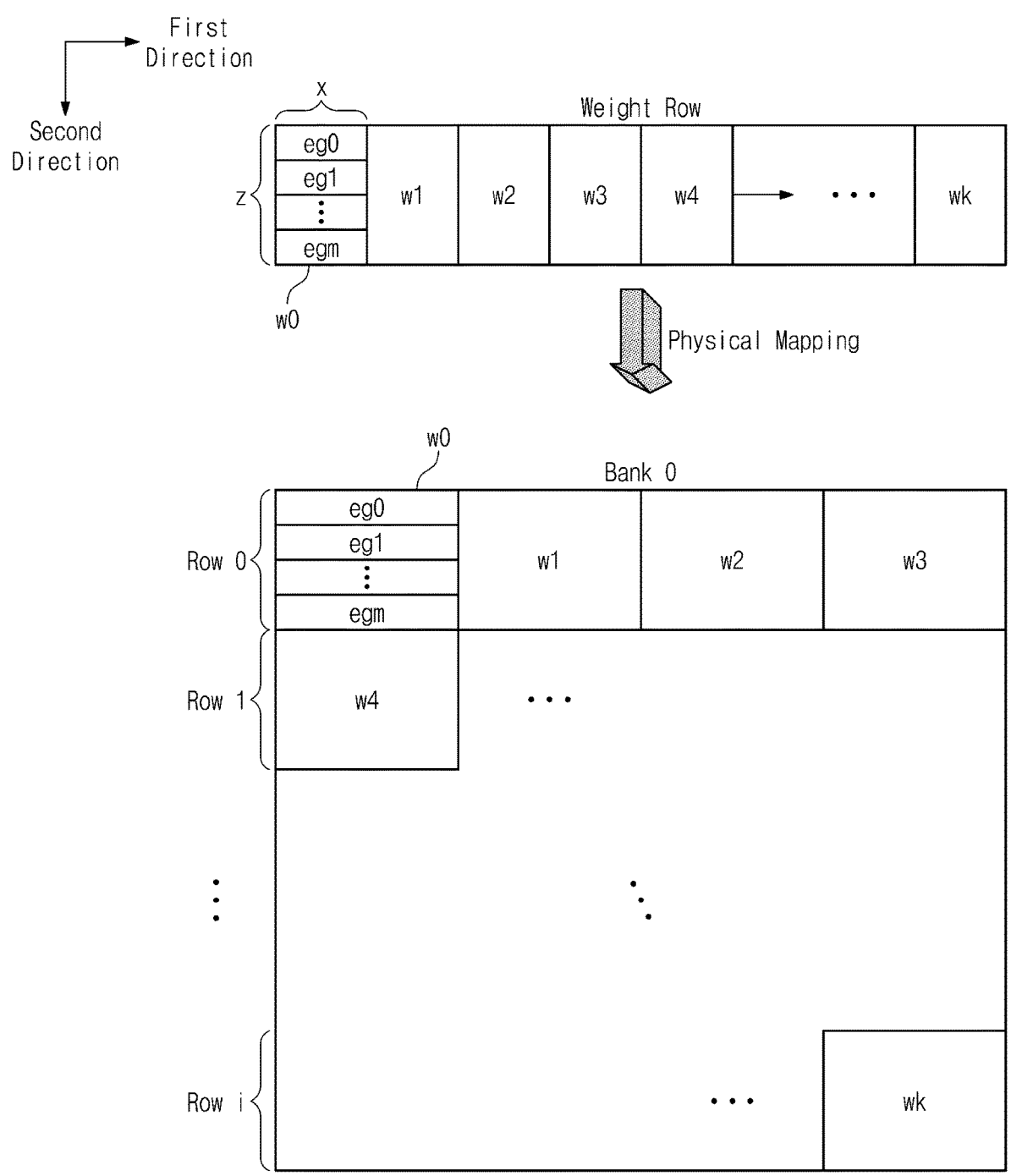
FIG. 6 is a diagram illustrating some embodiments in which weights are programmed in a first operation mode.

FIG. 6 is a diagram illustrating some embodiments in which weights are programmed in a first operation mode. In some embodiments, a configuration in which weights are programmed in the first memory bank, bank 0, will be described with reference to FIG. 6. In FIG. 6, the first memory bank, bank 0, may include a plurality of rows row 0 to row i. However, the number of rows included in the first memory bank, bank 0, is not limited thereto.

Weights may be programmed in the remaining memory banks to be identical or similar to the first memory bank, bank 0. In FIG. 6, "x" represents the number of devices of FIG. 5, and "z" represents the size of the first vector register 440 of FIG. 4.

Referring to FIG. 6, a weight row may include a plurality of weights w0 to wk. The first weight w0 may include a plurality of element groups eg0 to egm. The remaining weights w1 to wk may be configured to be identical to the first weight w0.

The first element group eg0 may include a plurality of elements in a first direction. Likewise, the second element group eg1 may include a plurality of elements in the first direction. As in the above description, the (m+1)-th element group egm may include a plurality of elements in the first direction.

The number of a plurality of elements included in each of the plurality of element groups eg0 to egm may be "x". The number of the plurality of element groups eg0 to egm may be "z".

The first weight w0 may include the plurality of element groups eg0 to egm in a second direction perpendicular to the first direction. One of the first direction and the second direction comprises a row direction, and another one of the first direction and the second direction comprises a column direction in which the plurality of memory cells (not illustrated) are arranged.

The weight row may be physically mapped to the first memory bank, bank 0. In this case, the first to fourth weights may be mapped to the first row, row 0. That is, in the first memory bank, bank 0, four weights may be mapped to each row. Accordingly, the fifth weight w4 may be mapped to the second row, row 1. As in the above description, the (k+1)-th weight wk may be mapped to the (i+1)-th row, row i.

The plurality of element groups eg0 to egm included in the first weight w0 may be mapped in the second direction. The number of a plurality of elements included in each of the plurality of element groups eg0 to egm may be mapped in the first direction. A plurality of element groups and a plurality of elements included in the remaining weights w1 to wk may be mapped to be identical to the first weight w0.

Figure 7:
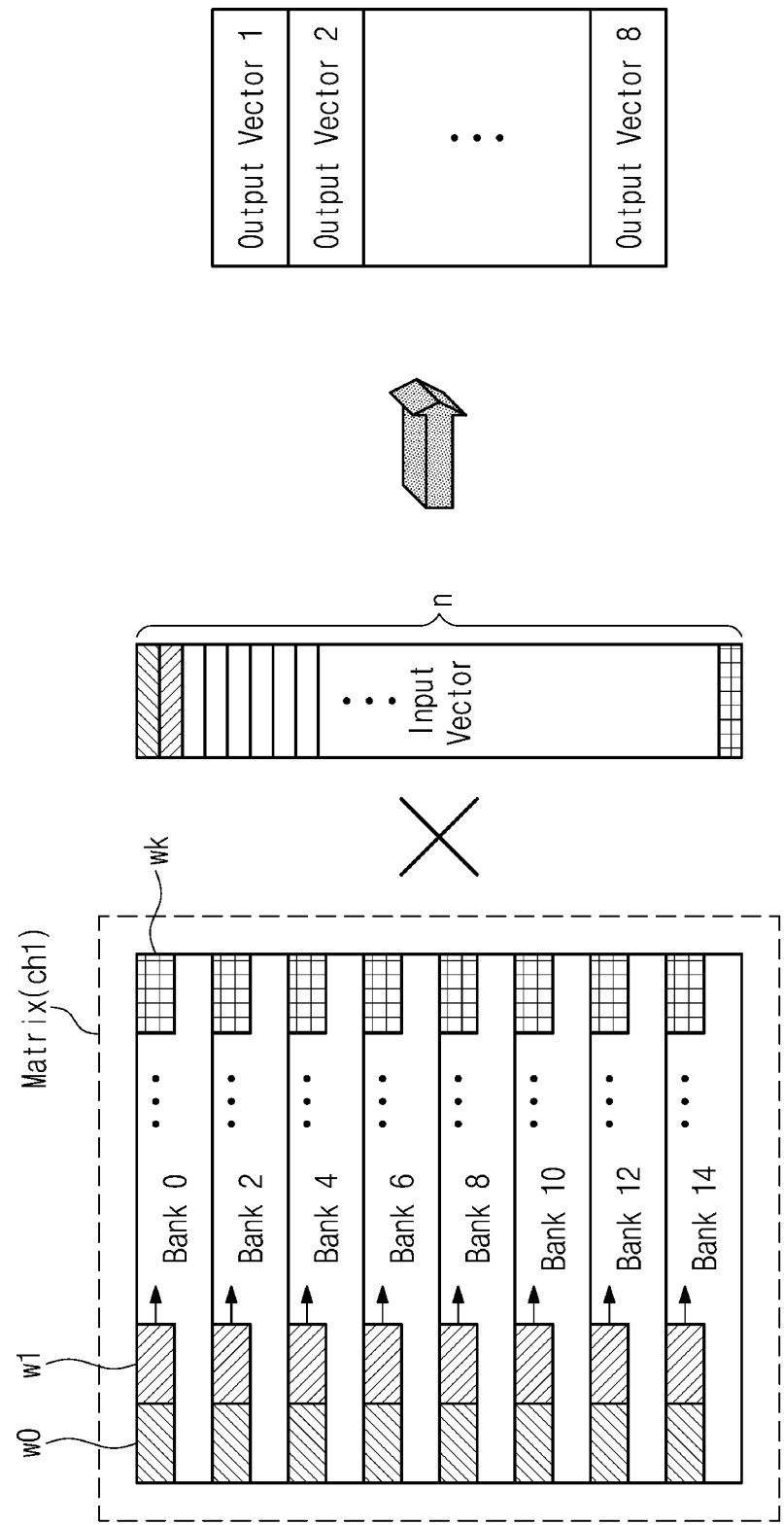
FIG. 7 is a diagram illustrating some embodiments in which a first PIM operation is performed on an input vector for each of a plurality of memory banks constituting or that are included in one matrix in a first operation mode.

FIG. 7 is a diagram illustrating some embodiments in which a first PIM operation is performed on an input vector for each of a plurality of memory banks constituting or that are included in one matrix in a first operation mode. In some embodiments, only one channel ch1 among a plurality of channels that electrically connect a memory device with an external host is illustrated in FIG. 7. In FIG. 7, "n" may be the number of vector inputs received through the channel ch1.

Figure 8:
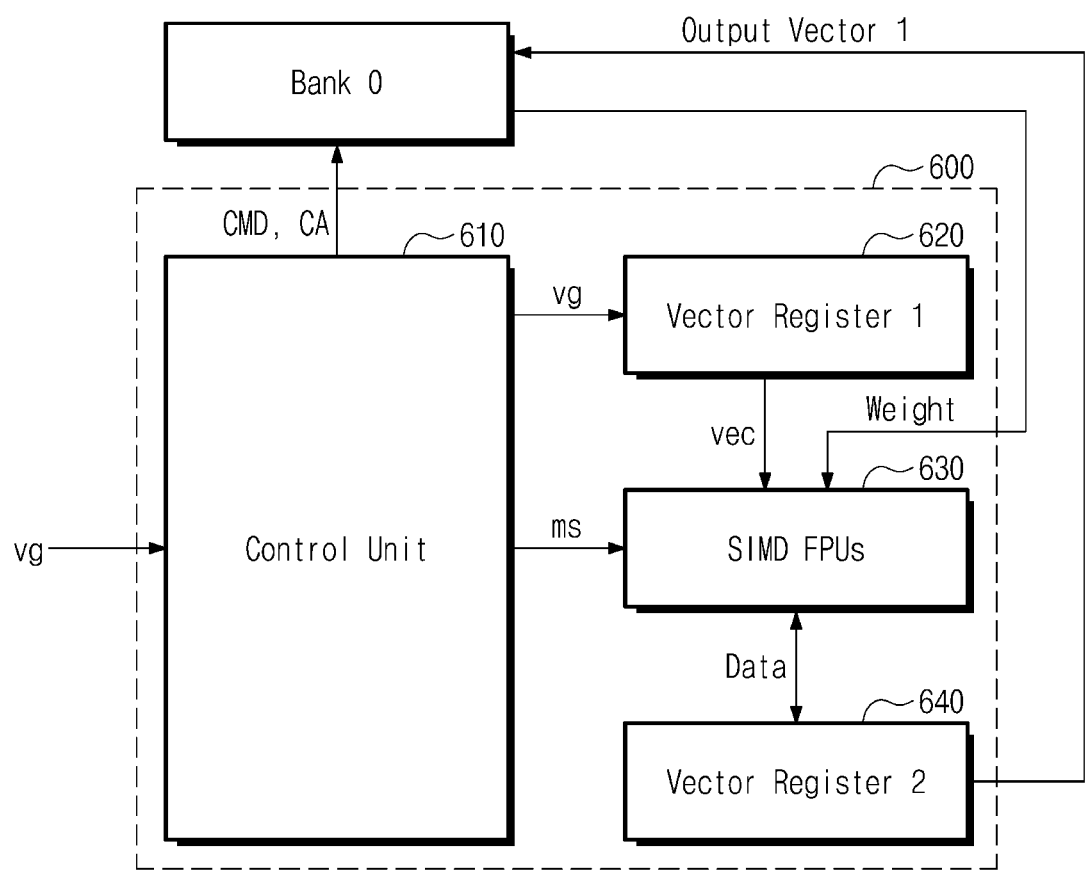
FIG. 8 is a diagram illustrating a configuration of a PIM unit operating in a first operation mode.

Referring to FIGS. 4 and 7, 8 memory banks, bank 0, bank 2, . . . , bank 14 may be electrically connected to the channel ch1. The 8 memory banks, bank 0, bank 2, . . . , bank 14 may be implemented in one matrix for performing the first PIM operation. However, the number of memory banks is not limited thereto.

The first memory bank, bank 0, may include the plurality of weights w0 to wk mapped thereto. Likewise, the remaining memory banks, bank 2 to bank 14 may include the plurality of weights w0 to wk mapped to be identical to the first memory bank, bank 0. The same description will be omitted with regard to the plurality of weights w0 to wk mapped.

The plurality of weights w0 to wk included in the first memory bank, bank 0, may be used to perform the first PIM operation on each vector input. A first output vector may be generated as a result of performing the first PIM operation on all the vector inputs received.

The plurality of weights w0 to wk included in the third memory bank, bank 2, may be used to perform the first PIM operation on each vector input. A second output vector may be generated as a result of performing the first PIM operation on all the vector inputs received.

As in the above description, the plurality of weights w0 to wk included in the 15th memory bank, bank 14, may be used to perform the first PIM operation on each vector input. An eighth output vector may be generated as a result of performing the first PIM operation on all the vector inputs received. The first PIM operation will be described in detail later.

FIG. 8 is a diagram illustrating a configuration of a PIM unit 600 operating in a first operation mode. In some embodiments, the PIM unit 600 of FIG. 8 may correspond to the first PIM unit PU0 of FIG. 3. A configuration of the second memory bank, bank 1 of FIG. 3 disposed adjacent to the PIM unit 600 may be identical to that of the first memory bank, bank 0. Accordingly, only the first memory bank, bank 0 disposed adjacent to the PIM unit 600 will be described with reference to FIG. 8.

Referring to FIG. 8, the PIM unit 600 may include a control unit 610, a first vector register 620, a SIMD FPUs 630, and a second vector register 640.

The control unit 610 may receive a vector input group vg. The vector input group vg may include a plurality of vector inputs. In this case, the vector input group vg may correspond to the input data of FIG. 4. The control unit 610 may provide the vector input group vg to the first vector register 620.

The first vector register 620 may operate under control of the control unit 610. The first vector register 620 may store the plurality of vector inputs and may output the vector inputs to the SIMD FPUs 630 one by one while moving the plurality of vector inputs stored therein.

The SIMD FPUs 630 may operate under control of the control unit 610 (i.e., in response to the mux signal ms).

For example, the SIMD FPUs 630 may perform the current first operation based on a vector input vec currently output from the first vector register 620 and a current weight "weight" read from the first memory bank, bank 0. When receiving the vector input vec, the control unit 610 may read weights of the first memory bank, bank 0, which correspond to the received vector input, based on the command CMD and the column address CA.

The second vector register 640 may operate under control of the control unit 610. The second vector register 640 may output the stored data to the SIMD FPUs 630 one by one.

In some embodiments, the stored data may include a result of the previous first PIM operation performed based on the vector input vec previously output from the first vector register 620 and a previous weight "weight" corresponding thereto.

The SIMD FPUs 630 may perform the current third operation based on the result of the previous first PIM operation output from the second vector register 640 and the result of the current first operation. The SIMD FPUs 630 may output data including the result of the current third operation to the second vector register 640. The result of the current third operation may indicate the result of the current first PIM operation.

When the result of the previous first PIM operation is absent from the second vector register 640, the SIMD FPUs 630 may output the result of the current first operation to the second vector register 640 without modification. When a result of the previous first PIM operation is present in the second vector register 640, the SIMD FPUs 630 may output the result of the current first PIM operation to the second vector register 640.

When the first operation is not performed by the SIMD FPUs 630 any longer, the second vector register 640 may output the result of the current first PIM operation as a first output vector. The control unit 610 may store the first output vector in the first memory bank, bank 0, based on the received command CMD and the received column address CA.

Afterwards, the control unit 610 may output the first output vector stored in the first memory bank, bank 0, to the external host in response to a command and an address received from the external host. In this case, the first output vector may correspond to the output data output of FIG. 4.

When the vector input vec provided to the SIMD FPUs 630 exists, the SIMD FPUs 630 may perform the next first operation based on a next vector input vec and a next weight "weight" read from the first memory bank, bank 0.

The second vector register 640 may output data including the result of the current first PIM operation to the SIMD FPUs 630. The SIMD FPUs 630 may perform the next third operation based on the result of the current first PIM operation and the result of the next first operation. The SIMD FPUs 630 may output data including a result of the next third operation to the second vector register 640. The result of the next third operation may indicate the result of the next first PIM operation.

As in the above description, the SIMD FPUs 630 may repeatedly perform the first PIM operation based on all the vector inputs included in the vector input group vg and weights corresponding thereto.

Figure 9:
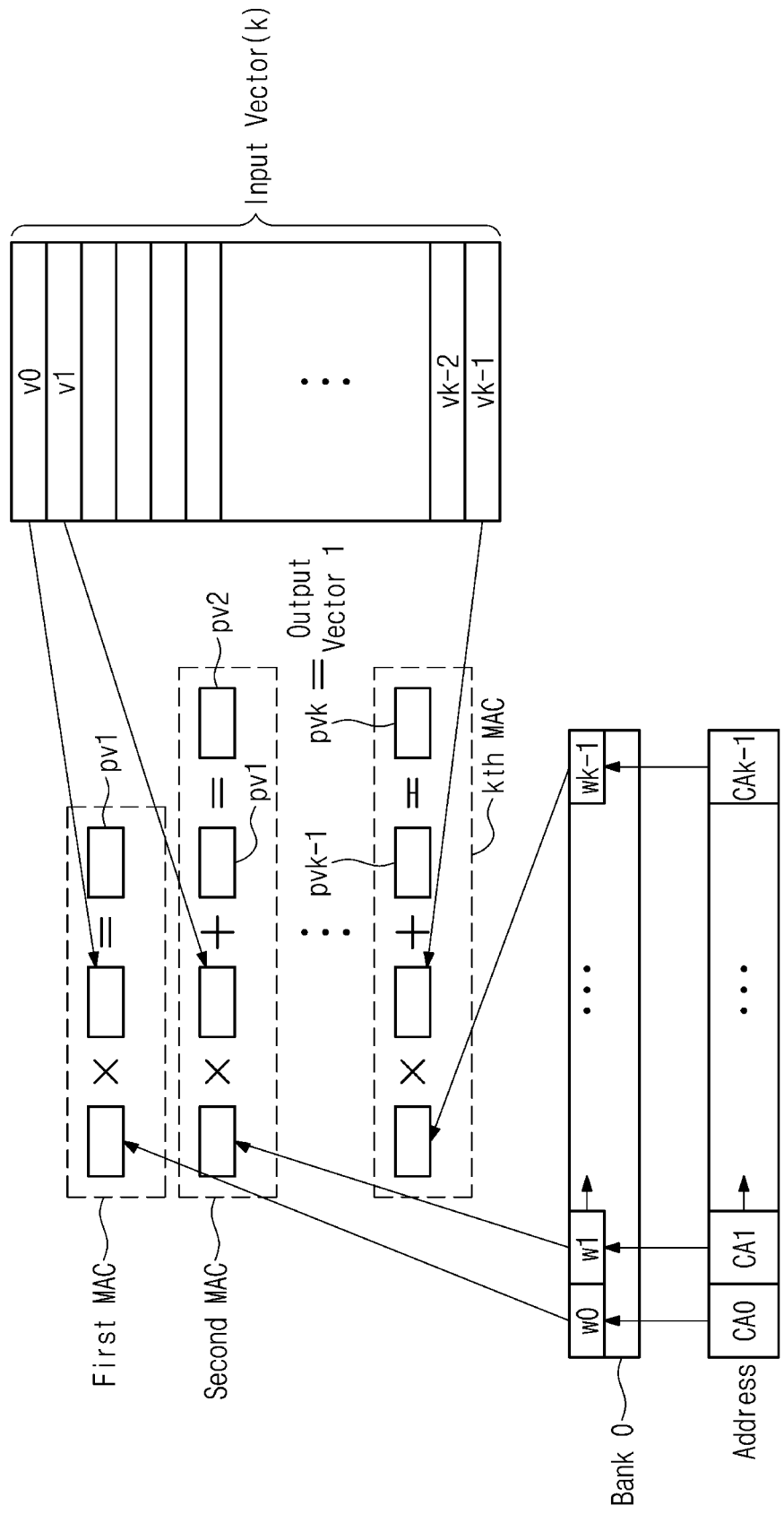
FIG. 9 is a diagram illustrating some embodiments in which a first PIM operation is performed in a first operation mode.

FIG. 9 is a diagram illustrating some embodiments in which a first PIM operation is performed in a first operation mode. In some embodiments, the first PIM operation that is performed only on weights stored in the first memory bank, bank 0, will be described with reference to FIG. 9. In FIG. 9, "k" may represent the number of vector inputs. The first PIM operation may include a multiply-accumulate operation (hereinafter referred to as "MAC").

Referring to FIGS. 8 and 9, the SIMD FPUs 630 may perform the first operation based on the first vector input v0 and the first weight w0. The first weight w0 may be present in a memory cell of the first memory bank, bank 0, which corresponds to the first column address CA0. A first partial vector pv1 may be generated as a result of the first operation. The first operation may be a multiplication operation.

The second vector register 640 may store the first partial vector pv1 (hereinafter referred to as a "result of the previous first PIM operation"). While the first partial vector pv1 is generated, because data are absent from the second vector register 640, the first MAC may include only the first operation.

When the second vector input v1 is currently received, the SIMD FPUs 630 may perform the current first operation based on the second vector input v1 and the second weight w1. The second weight w1 may be present in a memory cell of the first memory bank, bank 0, which corresponds to the second column address CA1.

Since the result of the previous first PIM operation is present in the second vector register 640, the SIMD FPUs 630 may perform the current third operation based on the result of the previous first PIM operation and the result of the current first operation. A second partial vector pv2 may be generated as the result of the current third operation. The third operation may be an accumulate operation. The second vector register 640 may store the second partial vector pv2. The second MAC may include the current first operation and the current third operation.

As in the above description, the k-th MAC will be described under the assumption that a (k−1)-th partial vector pvk−1 is generated based on a vector input vk−2 currently received. In this case, the (k−1)-th first operation and the (k−1)-th third operation may respectively be the current first operation and the current third operation. The SIMD FPUs 630 may perform the next first operation based on the vector input vk−1 and the k-th weight wk−1. The k-th weight wk−1 may be present in a memory cell of the first memory bank, bank 0, which corresponds to the k-th column address CAk−1.

Since the result of the current first PIM operation is present in the second vector register 640, the SIMD FPUs 630 may perform the next third operation based on the (k−1)-th partial vector pvk−1 and the result of the next first operation. A k-th partial vector pvk may be generated as the result of the next third operation. The second vector register 640 may store the k-th partial vector pvk. The k-th MAC may include the next first operation and the next third operation.

The second vector register 640 may output the k-th partial vector pvk as the first output vector. The control unit 610 may store the first output vector in the first memory bank, bank 0, based on the received command CMD and the received column address CA.

Figure 10:
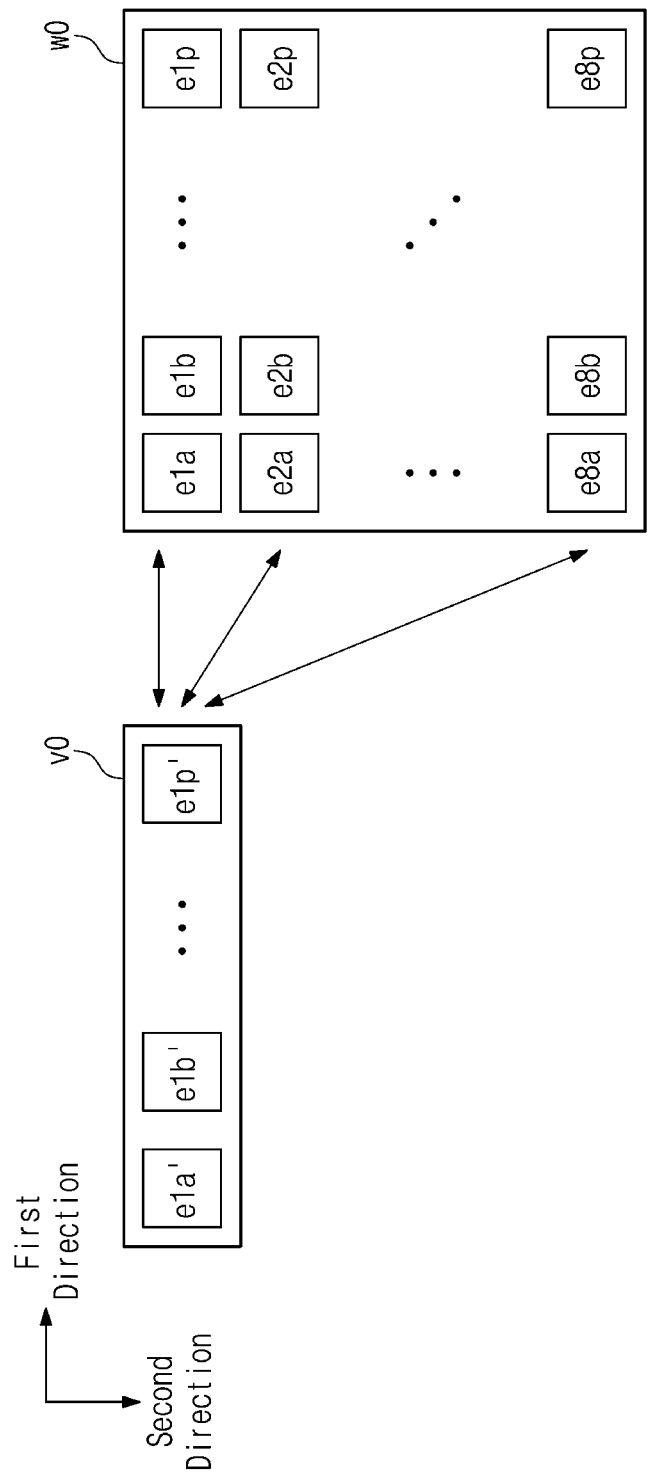
FIG. 10 is a diagram illustrating an arrangement of elements for performing a first PIM operation in a first operation mode.

FIG. 10 is a diagram illustrating an arrangement of elements used for performing a first PIM operation in a first operation mode. In some embodiments, one vector input (e.g., the first vector input v0 of FIG. 9) and one weight (e.g., the first weight w0 of FIG. 9) will be only described with reference to FIG. 10. Configurations of the remaining weights w1 to wk−1 and the remaining vector inputs v1 to vk−1 may be identical or similar to configurations of the first weight w0 and the first vector input v0.

Referring to FIGS. 5, 9, and 10, the first vector input v0 may include a plurality of elements arranged in the first direction, and the number of the plurality of elements may be identical to the number of the plurality of devices (FPU 0 to FPU 15) 551 included in the SIMD FPUs 550.

That is, because the number of the plurality of devices (FPU 0 to FPU 15) 551 of FIG. 5 is 16, the first vector input v0 may include 16 elements. When the number of a plurality of devices changes, the number of elements of the first vector input v0 may also change.

The plurality of multiplexers MUX 0 to MUX 15 may select the vector input v0 (e.g., the vector data vec1 of FIG. 5) based on the mux signal ms.

In this case, a first element e1a' included in the first vector input v0 may be selected by the first multiplexer MUX 0. A second element e1b' included in the first vector input v0 may be selected by the second multiplexer MUX 1. As in the above description, a 16th element e1p' included in the first vector input v0 may be selected by the 16th multiplexer MUX 15.

The first weight w0 may be input to the plurality of devices (FPU 0 to FPU 15) 551 from a memory bank. For example, the first weight w0 may include 8 element groups in the second direction. However, the number of element groups included in the first weight w0 is not limited thereto.

For example, the first element group may include a plurality of elements e1a to e1p in the first direction. The second element group may include a plurality of elements e2a to e2p in the first direction. As in the above description, the eighth element group may include a plurality of elements e8a to e8p in the first direction.

The first weight w0 stored in the memory bank may be read in the second direction. That is, the first element group may be read prior to the second element group. The eight element group may be read finally.

Accordingly, an operation may be performed on the first element group prior to the second element group, and an operation may be finally performed on the eighth element group.

The first element e1a included in the first element group may be applied to the first device FPU 0. The second element e1b included in the first element group may be applied to the second device FPU 1. As in the above description, the 16th element e1p included in the first element group may be applied to the 16th device FPU 15.

The first device FPU 0 may perform the first operation based on the first element e1a included in the first element group and the first element e1a' included in the first vector input v0.

The second device FPU 1 may perform the first operation based on the second element e1b included in the first element group and the second element e1b' included in the first vector input v0.

As in the above description, the 16th device FPU 15 may perform the first operation based on the 16th element e1p included in the first element group and the 16th element e1p' included in the first vector input v0.

A result of performing the first operation on the first vector input v0 and the first element group may be stored in the second vector register 560. In some embodiments, when data stored in the second vector register 560 exist, the SIMD FPUs 550 may perform the third operation based on the data output from the second vector register 560 and the result of the first operation.

The third operation may be the accumulate operation of each element included in the result of the first operation and each element included in the output data. In this case, the result of the third operation may be stored in the second vector register 560.

Next, the first device FPU 0 may perform the first operation based on the first element e2a included in the second element group and the first element e2a' included in the first vector input v0.

The second device FPU 1 may perform the first operation based on the second element e2b included in the second element group and the second element e1b' included in the first vector input v0.

As in the above description, the 16th device FPU 15 may perform the first operation based on the 16th element e2p included in the second element group and the 16th element e1p' included in the first vector input v0.

A result of performing the first operation on the first vector input v0 and the second element group may be stored in the second vector register 560. In some embodiments, when data stored in the second vector register 560 exist, the SIMD FPUs 550 may perform the third operation based on the data output from the second vector register 560 and the result of the first operation.

The third operation may be the accumulate operation of each element included in the result of the first operation and each element included in the output data. In this case, the result of the third operation may be stored in the second vector register 560.

As in the above description, the first device FPU 0 may perform the first operation based on the first element e8a included in the eighth element group and the first element e1a' included in the first vector input v0.

The second device FPU 1 may perform the first operation based on the second element e8b included in the eighth element group and the second element e1b' included in the first vector input v0.

As in the above description, the 16th device FPU 15 may perform the first operation based on the 16th element e8p included in the eighth element group and the 16th element e1p' included in the first vector input v0.

A result of performing the first operation on the first vector input v0 and the eighth element group may be stored in the second vector register 560. In some embodiments, when data stored in the second vector register 560 exist, the SIMD FPUs 550 may perform the third operation based on the data output from the second vector register 560 and the result of the first operation.

The third operation may be the accumulate operation of each element included in the result of the first operation and each element included in the output data. In this case, the result of the third operation may be stored in the second vector register 560.

According to the above description, the PIM unit 500 may generate a result of the final first PIM operation while repeatedly performing the first PIM operation on a received vector input. The result of the final first PIM operation may be the first output vector.

Afterwards, the PIM unit 500 may output the first output vector stored in the first memory bank, bank 0, to the external host in response to a command and an address received from the external host.

Since the first PIM operation does not include an operation between a plurality of elements that belong to each element group and are arranged in the first direction, the external host may need to additionally perform the operation between the plurality of elements of each element group arranged in the first direction. Accordingly, the additional operation of the external host may cause an increase in the amount of data communication between the memory device and the external host.

Figure 11:
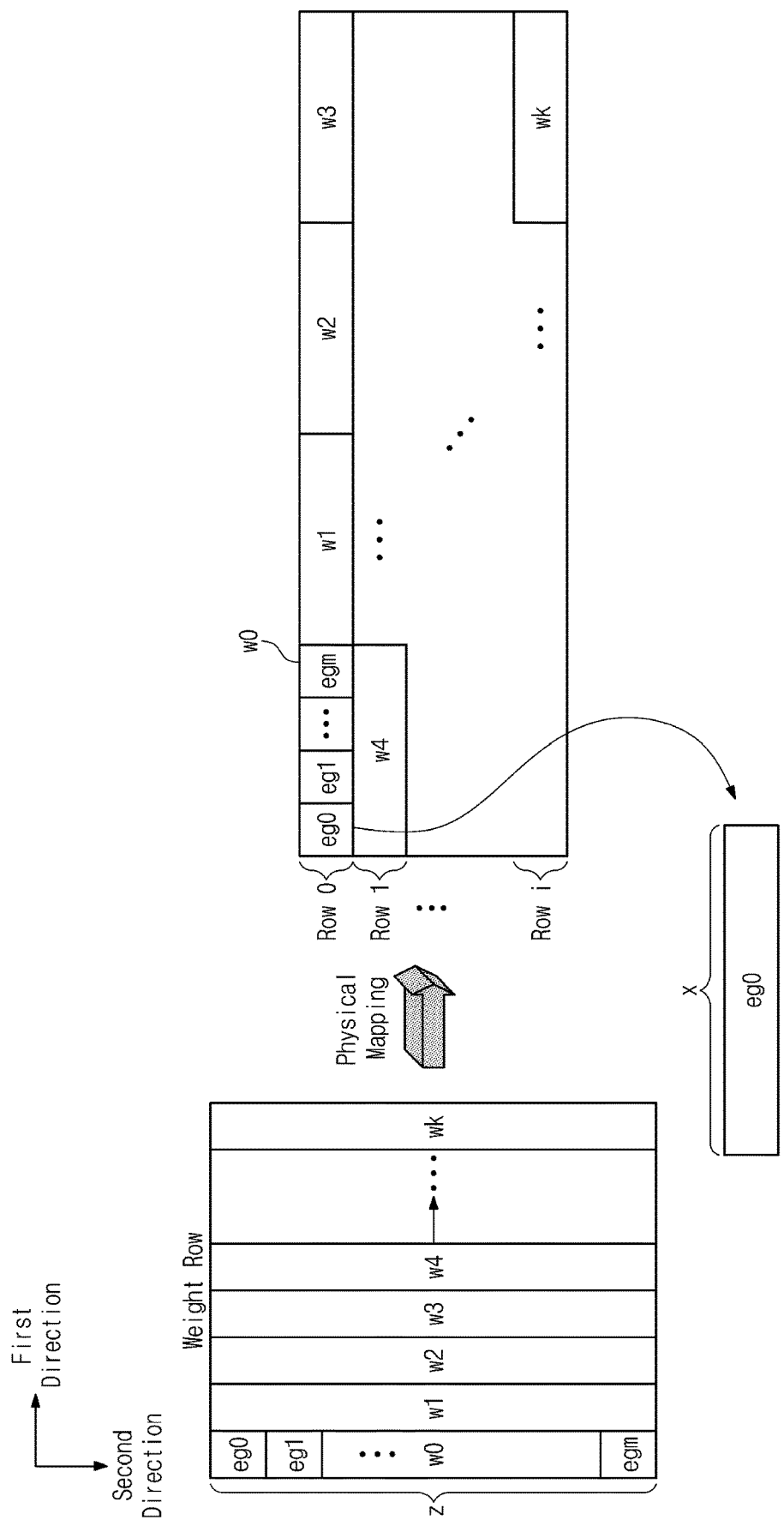
FIG. 11 is a diagram illustrating some embodiments in which weights are programmed in a second operation mode.

FIG. 11 is a diagram illustrating some embodiments in which weights are programmed in a second operation mode. In some embodiments, a configuration in which weights are programmed in the first memory bank, bank 0, will be described with reference to FIG. 11. In FIG. 11, the first memory bank, bank 0, may include the plurality of rows, row 0 to row i. However, the number of rows included in the first memory bank, bank 0, is not limited thereto.

As in the first memory bank, bank 0, weights may be programmed in the remaining memory banks. In FIG. 11, "x" may represent the number of a plurality of devices, and "z" represents the size of the first vector register 440 of FIG. 4.

Referring to FIG. 11, a weight row may include the plurality of weights w0 to wk. The first weight w0 may include the plurality of element groups eg0 to egm. The remaining weights w1 to wk may be configured to be identical or similar to the first weight w0.

The first element group eg0 may include a plurality of elements in the first direction. Likewise, the second element group eg1 may include a plurality of elements in the first direction. As in the above description, the (m+1)-th element group egm may include a plurality of elements in the first direction.

For example, the number of a plurality of elements included in the first element group eg0 may be "x". Although not illustrated, the number of a plurality of elements included in each of the remaining element groups eg1 to egm may be "x". The number of the plurality of element groups eg0 to egm may be "z". The first weight w0 may include the plurality of element groups eg0 to egm in the first direction.

The weight row may be physically mapped to the first memory bank, bank 0. In this case, the first to fourth weights may be mapped to the first row, row 0. That is, in the first memory bank, bank 0, four weights may be mapped to each row. Accordingly, the fifth weight w4 may be mapped to the second row, row 1. As in the above description, the (k+1)-th weight wk may be mapped to the (i+1)-th row, row i.

The plurality of element groups eg0 to egm included in the first weight w0 may be mapped in the first direction. The number of a plurality of elements included in each of the plurality of element groups eg0 to egm may be mapped in the first direction. A plurality of element groups and a plurality of elements included in the remaining weights w1 to wk may be mapped to be identical or similar to the first weight w0.

Figure 12:
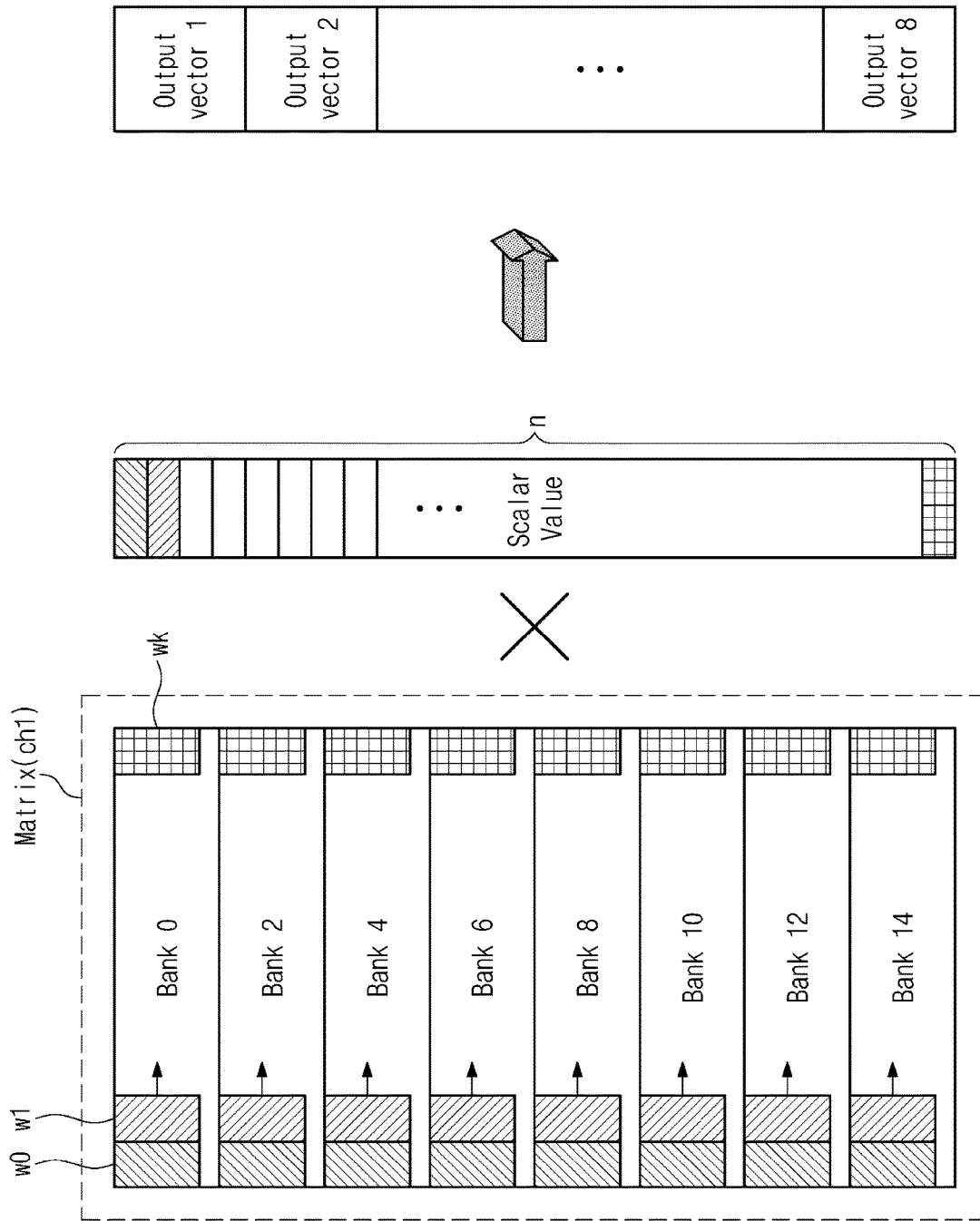
FIG. 12 is a diagram illustrating some embodiments in which a second PIM operation is performed on a scalar input for each of a plurality of memory banks constituting or that are included in one matrix in a second operation mode.

FIG. 12 is a diagram illustrating some embodiments in which a second PIM operation is performed on a scalar input for each of a plurality of memory banks constituting or that are included in one matrix in a second operation mode.

In some embodiments, only one channel ch1 among a plurality of channels that electrically connect a memory device with an external host is illustrated in FIG. 12. In FIG. 12, "n" may be the number of scalar inputs received through the channel ch1.

Referring to FIGS. 4 and 12, 8 memory banks, bank 0, bank 2, . . . , bank 14 may be electrically connected to the channel ch1. The 8 memory banks, bank 0, bank 2, . . . , bank 14 may be implemented in one matrix for performing the second PIM operation. However, the number of memory banks is not limited thereto.

The first memory bank, bank 0, may include the plurality of weights w0 to wk mapped thereto. Likewise, the remaining memory banks, bank 2 to bank 14, may include the plurality of weights w0 to wk mapped to be identical to the memory bank, bank 0. The same description will be omitted with regard to the plurality of weights w0 to wk mapped.

The plurality of weights w0 to wk included in the first memory bank, bank 0, may be used to perform the second PIM operation on each scalar input. A first output vector may be generated as a result of performing the second PIM operation on some or all of the scalar inputs received.

The plurality of weights w0 to wk included in the third memory bank, bank 2 may be used to perform the second PIM operation on each scalar input. A second output vector may be generated as a result of performing the second PIM operation on some or all of the scalar inputs received.

As in the above description, the plurality of weights w0 to wk included in the 15th memory bank, bank 14, may be used to perform the second PIM operation on each scalar input. An eighth output vector may be generated as a result of performing the second PIM operation on some or all of the scalar inputs received. The second PIM operation will be described in detail later.

Figure 13:
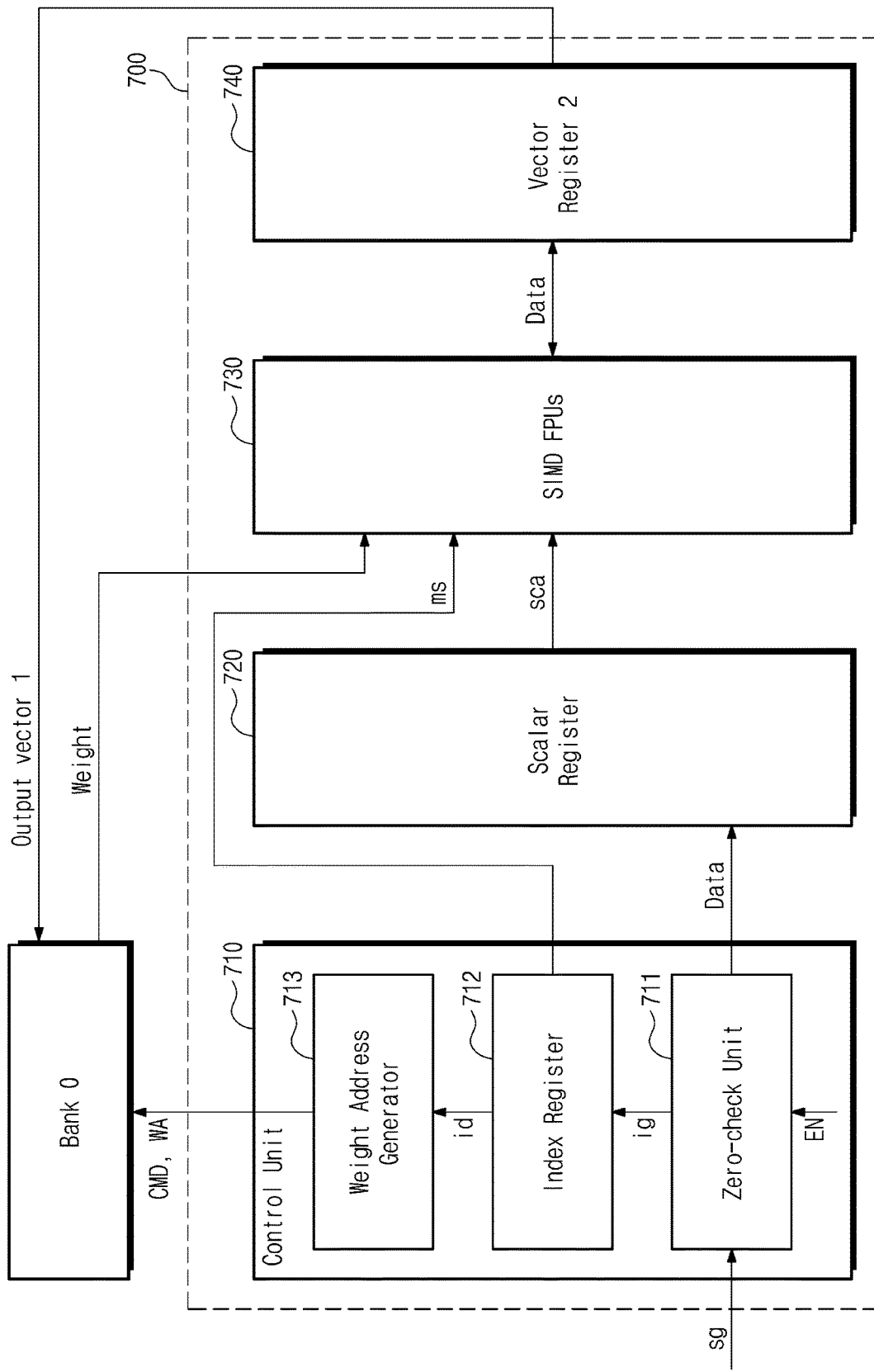
FIG. 13 is a diagram illustrating a configuration of a PIM unit operating in a second operation mode.

FIG. 13 is a diagram illustrating a configuration of a PIM unit 700 operating in a second operation mode. In some embodiments, the PIM unit 700 of FIG. 13 may correspond to the first PIM unit PU0 of FIG. 3. A configuration of the second memory bank, bank 1, of FIG. 3 disposed adjacent to the PIM unit 700 may be identical or similar to that of the first memory bank, bank 0. Accordingly, only the first memory bank, bank 0, disposed adjacent to the PIM unit 700 will be described with reference to FIG. 13.

Referring to FIG. 13, the PIM unit 700 may include a control unit 710, a scalar register 720, a SIMD FPUs 730, and a second vector register 740.

The control unit 710 may include a zero-check unit 711, an index register 712, and a weight address generator 713. The control unit 710 may determine whether to activate the zero-check unit 711, based on an enable signal EN.

The zero-check unit 711 may receive a scalar input group sg. In this case, the scalar input group sg may correspond to the input data of FIG. 4. When the zero-check unit 711 is activated, the zero-check unit 711 may extract a scalar input having a zero value while receiving the scalar input group sg. The zero-check unit 711 may transmit scalar inputs, which do not include a zero value, to the scalar register 720.

When the zero-check unit 711 is deactivated, the control unit 710 may transfer the scalar input group sg to the scalar register 720.

When the zero-check unit 711 is activated, the zero-check unit 711 may generate an index whenever a scalar input having a non-zero value is received. The zero-check unit 711 may provide the index register 712 with an index group ig generated based on a plurality of scalar inputs having a non-zero value. The index group ig may include a plurality of indexes.

When the zero-check unit 711 is deactivated, the control unit 710 may generate an index whenever a scalar input is received. Likewise, the control unit 710 may store the index group ig in the index register 712.

The index register 712 may store a plurality of indexes and may output the indexes to the weight address generator 713 one by one by moving the plurality of indexes stored therein.

The weight address generator 713 may generate a weight address WA based on a received index id. For example, when the command CMD is the read command and a currently received index id is "a", the weight address generator 713 may generate the weight address WA such that data stored at an a-th column of the first memory bank, bank 0, are read. The weight address WA may correspond to the address ADDR of FIG. 4.

The scalar register 720 may operate under control of the control unit 710. The scalar register 720 may store data including a plurality of scalar inputs and may output a scalar input sca to the SIMD FPUs 730 one by one while moving the stored data.

The SIMD FPUs 730 may operate under control of the control unit 710 (i.e., in response to the mux signal ms).

For example, the SIMD FPUs 730 may perform the current first operation based on the scalar input sca currently output from the scalar register 720 and a current weight "weight" read from the first memory bank, bank 0. The control unit 710 may read the weight "weight" stored in the first memory bank, bank 0, based on the command CMD and the weight address WA.

The second vector register 740 may operate under control of the control unit 710. The second vector register 740 may output the stored data to the SIMD FPUs 730 one by one.

In some embodiments, the stored data may include a result of the previous second PIM operation performed based on the scalar data sca previously output from the scalar register 720 and a previous weight "weight" corresponding thereto.

The SIMD FPUs 730 may perform the current fourth operation based on the result of the previous second PIM operation output from the second vector register 740 and the result of the current second operation. The SIMD FPUs 730 may output data including the result of the current fourth operation to the second vector register 740. The result of the current fourth operation may indicate the result of the current second PIM operation.

When the result of the previous second PIM operation is absent from the second vector register 740, the SIMD FPUs 730 may output the result of the current second operation to the second vector register 740 without modification. When a result of the previous second PIM operation is present in the second vector register 740, the SIMD FPUs 730 may output the result of the current second PIM operation to the second vector register 740.

When the second operation is not performed by the SIMD FPUs 730 any longer, the second vector register 740 may output the result of the current second PIM operation as a first output vector. The control unit 710 may store the first output vector in the first memory bank, bank 0, based on the received command and the received column address.

Afterwards, the control unit 710 may output the first output vector stored in the first memory bank, bank 0, to the external host in response to a command and an address received from the external host. In this case, the first output vector may correspond to the output data output of FIG. 4.

When the scalar data sca provided to the SIMD FPUs 730 exists, the SIMD FPUs 730 may perform the next second operation based on a next scalar data sca and a next weight "weight" read from the first memory bank, bank 0.

The second vector register 740 may output data including the result of the current second PIM operation to the SIMD FPUs 730. The SIMD FPUs 730 may perform the next fourth operation based on the result of the current second PIM operation and the result of the next second operation. The SIMD FPUs 730 may output data including the result of the next fourth operation to the second vector register 740. The result of the next fourth operation may indicate the result of the next second PIM operation.

As in the above description, the SIMD FPUs 730 may repeatedly perform the second PIM operation based on some or all of scalar inputs included in the scalar input group sg and weights corresponding thereto.

Figure 14:
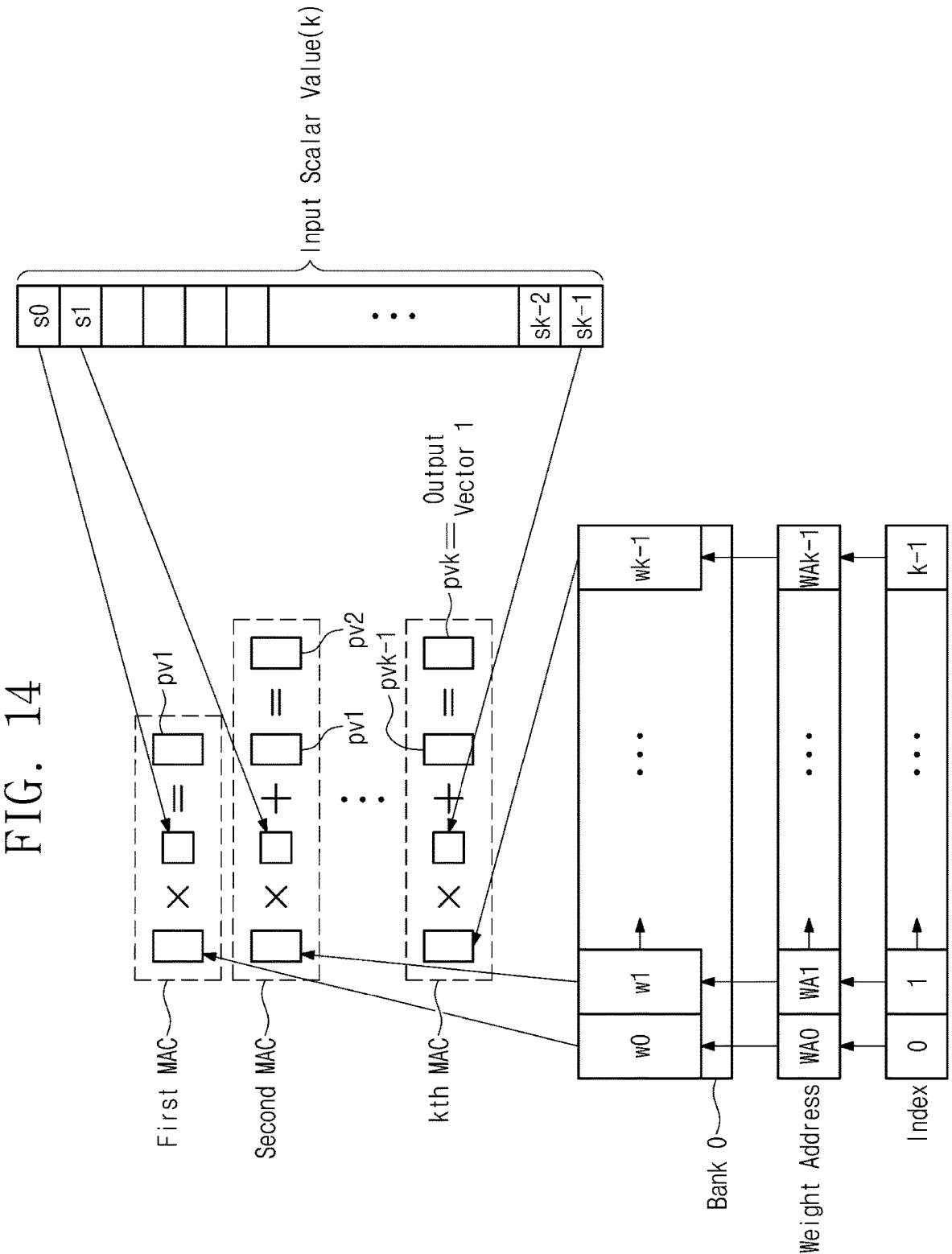
FIG. 14 is a diagram illustrating a first embodiment in which a second PIM operation is performed in a second operation mode.

FIG. 14 is a diagram illustrating a first embodiment in which a second PIM operation is performed in a second operation mode. Example embodiments in which a zero-check is not performed will be described with reference to FIG. 14.

The second PIM operation that is performed only on weights stored in the first memory bank, bank 0, will be described with reference to FIG. 14. In FIG. 14, "k" may represent the number of scalar inputs. The second PIM operation may include a multiply-accumulate operation (hereinafter referred to as "MAC").

Referring to FIGS. 13 and 14, the SIMD FPUs 730 may perform the second operation based on the first scalar input s0 and the first weight w0. The first weight w0 may be present in a memory cell of the first memory bank, bank 0, which corresponds to the first weight address WA0. The first partial vector pv1 may be generated as a result of the second operation. The second operation may be a multiplication operation.

The first weight address WA0 may be generated based on an index whose value is "0". When first receiving a scalar input having a zero or non-zero value, the zero-check unit 711 may generate the index whose value is "0".

The second vector register 740 may store the first partial vector pv1 (hereinafter referred to as a "result of the previous second PIM operation"). While the first partial vector pv1 is generated, because data are absent from the second vector register 740, the first MAC may include only the second operation.

When the second scalar input s1 is currently received, the SIMD FPUs 730 may perform the current second operation based on the second scalar input s1 and the second weight w1. The second weight w1 may be present in a memory cell of the first memory bank, bank 0, which corresponds to the second weight address WA1.

The second weight address WA1 may be generated based on an index whose value is "1". When a scalar input having a zero or non-zero value is currently received following the previous scalar input, the zero-check unit 711 may generate the index whose value is "1".

Since the result of the previous second PIM operation is present in the second vector register 740, the SIMD FPUs 730 may perform the current fourth operation based on the result of the previous second PIM operation and the result of the current second operation. The fourth operation may be an accumulate operation. The second vector register 740 may store the second partial vector pv2. The second MAC may include the current second operation and the current fourth operation.

As in the above description, the k-th MAC will be described under the assumption that a (k−1)-th partial vector pvk−1 is generated based on a scalar input sk−2 currently received. In this case, the (k−1)-th second operation and the (k−1)-th fourth operation may respectively be the current second operation and the current fourth operation. The SIMD FPUs 730 may perform the next second operation based on a scalar input sk−1 and the k-th weight wk−1. The k-th weight wk−1 may be present in a memory cell of the first memory bank, bank 0, which corresponds to the k-th weight address WAk−1. The k-th partial vector pvk may be generated as the result of the next second operation.

The k-th weight address WAk−1 may be generated based on an index whose value is "k−1". When a next scalar input sk−1 having a zero or non-zero value is received following the current scalar input sk−2, the zero-check unit 711 may generate the index whose value is "k−1".

Since the result of the current second PIM operation is present in the second vector register 740, the SIMD FPUs 730 may perform the next fourth operation based on the (k−1)-th partial vector pvk−1 and the result of the next second operation. The second vector register 740 may store the k-th partial vector pvk. The k-th MAC may include the next second operation and the next fourth operation.

The second vector register 740 may output the k-th partial vector pvk as the first output vector. The control unit 710 may store the first output vector in the first memory bank, bank 0, based on the received command and the received column address.

Figure 15:
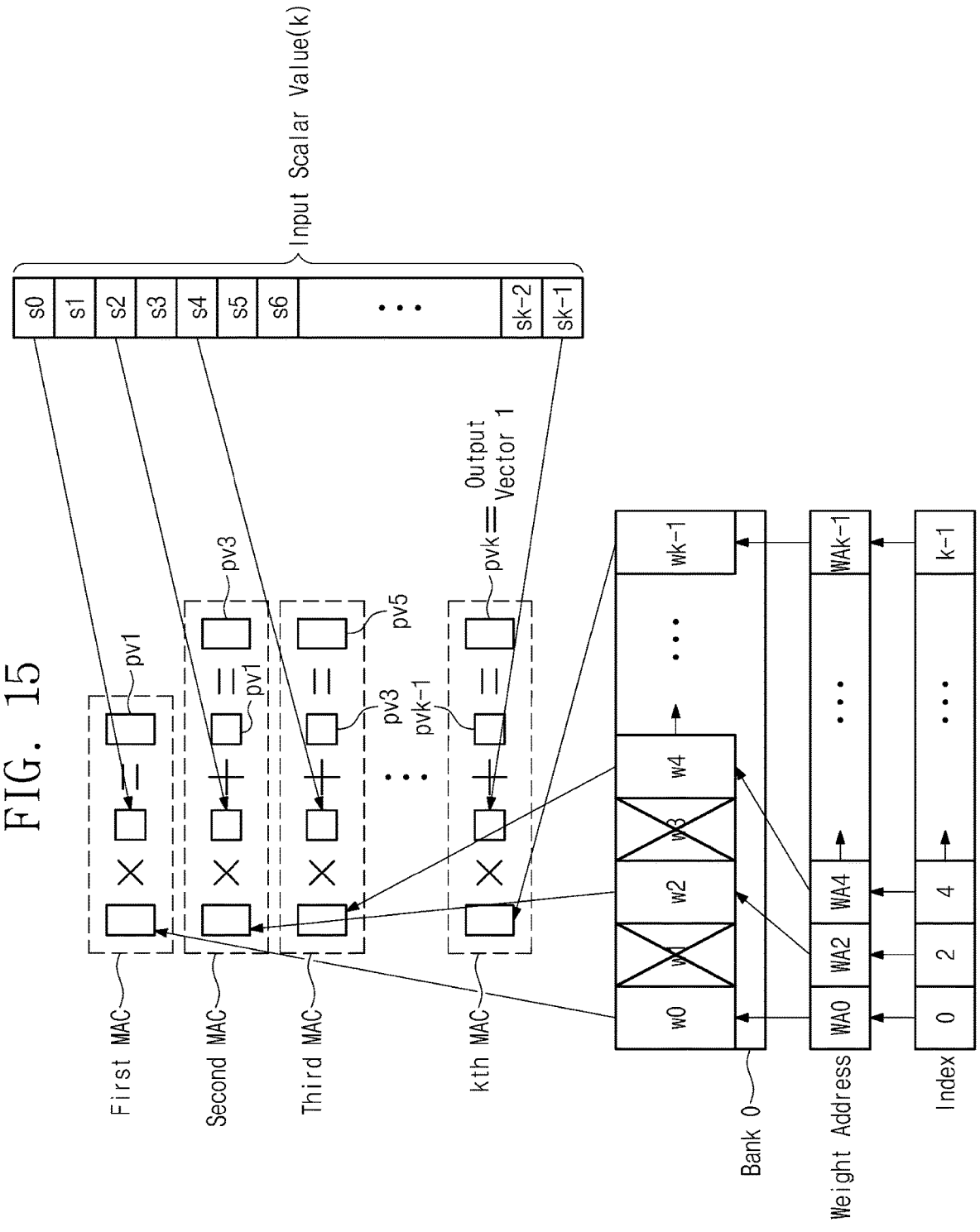
FIG. 15 is a diagram illustrating a second embodiment in which a second PIM operation is performed in a second operation mode.

FIG. 15 is a diagram illustrating a second embodiment in which a second PIM operation is performed in a second operation mode. Example embodiments in which a zero-check is performed will be described with reference to FIG. 15. The description that is identical to the description given with reference to FIG. 14 will be omitted.

Referring to FIGS. 13 and 15, the SIMD FPUs 730 may perform the second operation based on the first scalar input s0 having a non-zero value and the first weight w0. The first weight w0 may be present in a memory cell of the first memory bank, bank 0, which corresponds to the first weight address WA0. The first partial vector pv1 may be generated as a result of the second operation. The second operation may be a multiplication operation.

The first weight address WA0 may be generated based on an index whose value is "0". When first receiving a scalar input having a non-zero value, the zero-check unit 711 may generate the index whose value is "0".

The second vector register 740 may store the first partial vector pv1 (hereinafter referred to as a "result of the previous second PIM operation"). While the first partial vector pv1 is generated, because data are absent from the second vector register 740, the first MAC may include only the second operation.

Since the second scalar input s1 has a value of "0", the zero-check unit 711 may not generate an index even though the second scalar input s1 is received. Accordingly, the weight address generator 713 may not generate a second weight address for reading the second weight w1 corresponding to the second scalar input s1.

When the third scalar input s2 is currently received, the SIMD FPUs 730 may perform the current second operation based on the third scalar input s2 and the third weight w2. The third weight w2 may be present in a memory cell of the first memory bank, bank 0, which corresponds to the third weight address WA2.

The third weight address WA2 may be generated based on an index whose value is "2". When the zero-check unit 711 receives the second scalar input s2 having a current non-zero value after the scalar input s0 having a previous non-zero value, the zero-check unit 711 may generate an index whose value is "2", not "1".

Since the result of the previous second PIM operation is present in the second vector register 740, the SIMD FPUs 730 may perform the current fourth operation based on the result of the previous second PIM operation and the result of the current second operation. The fourth operation may be an accumulate operation. The second vector register 740 may store the third partial vector pv3. The second MAC may include the current second operation and the current fourth operation.

Since the fourth scalar input s3 has a value of "0", the zero-check unit 711 may not generate an index even though the fourth scalar input s3 is received. Accordingly, the weight address generator 713 may not generate a fourth weight address for reading the fourth weight w3 corresponding to the fourth scalar input s3.

When the fifth scalar input s4 is next received, the SIMD FPUs 730 may perform the current second operation based on the fifth scalar input s4 and the fifth weight w4. The fifth weight w4 may be present in a memory cell of the first memory bank, bank 0, which corresponds to the fifth weight address WA4.

The fifth weight address WA4 may be generated based on an index whose value is "4". When the zero-check unit 711 receives the scalar input s4 having a next non-zero value after the scalar input s2 having the current non-zero value, the zero-check unit 711 may generate an index whose value is "4", not "3".

Since the result of the current second PIM operation is present in the second vector register 740, the SIMD FPUs 730 may perform the next fourth operation based on the result of the current second PIM operation and a result of the next second operation. The second vector register 740 may store the fifth partial vector pv5. The third MAC may include the next second operation and the next fourth operation.

Since the sixth scalar input s5 has a value of "0", the zero-check unit 711 may not generate an index even though the sixth scalar input s5 is received. Accordingly, the weight address generator 713 may not generate a sixth weight address for reading the sixth weight w5 corresponding to the sixth scalar input s5.

Since the seventh scalar input s6 has a value of "0", the zero-check unit 711 may not generate an index even though the seventh scalar input s6 is received. Accordingly, the weight address generator 713 may not generate a seventh weight address for reading the seventh weight w6 corresponding to the seventh scalar input s6.

As in the above description, the k-th MAC will be described under the assumption that a (k−1)-th partial vector pvk−1 is generated based on a scalar input sk−2 having a currently received non-zero value. In this case, the (k−1)-th second operation and the (k−1)-th fourth operation may respectively be the current second operation and the current fourth operation. The SIMD FPUs 730 may perform the next second operation based on the scalar input sk−1 having a non-zero value and the k-th weight wk−1. The k-th weight wk−1 may be present in a memory cell of the first memory bank, bank 0, which corresponds to the k-th weight address WAk−1.

The k-th weight address WAk−1 may be generated based on an index whose value is "k−1". When the zero-check unit 711 receives a next scalar input sk−1 having a non-zero value following the scalar input sk−2 having a current non-zero value, the zero-check unit 711 may generate the index whose value is "k−1".

Since the result of the current second PIM operation is present in the second vector register 740, the SIMD FPUs 730 may perform the next fourth operation based on the (k−1)-th partial vector pvk−1 and the result of the next second operation. The second vector register 740 may store the k-th partial vector pvk (i.e., the first output vector). The k-th MAC may include the next second operation and the next fourth operation.

Figure 16:
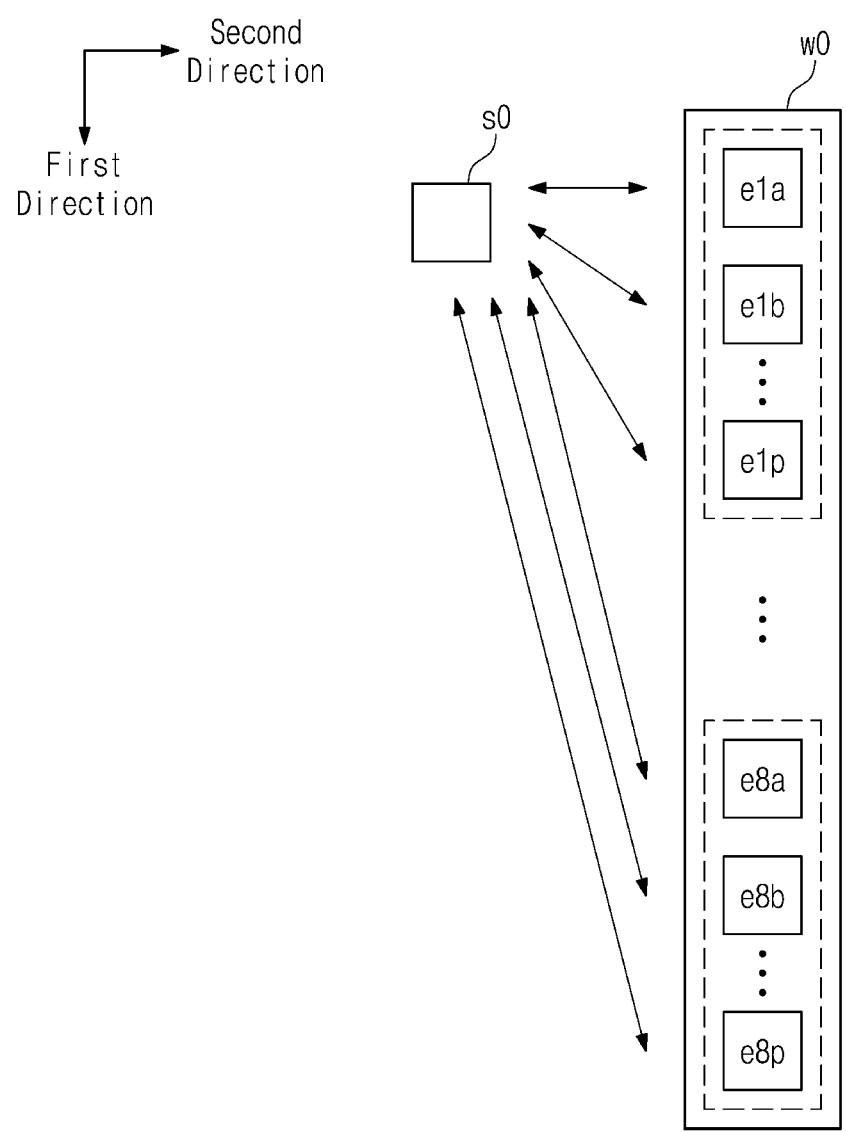
FIG. 16 is a diagram illustrating an arrangement of elements for performing a second PIM operation in a second operation mode.

FIG. 16 is a diagram illustrating an arrangement of elements for performing a second PIM operation in a second operation mode. In some embodiments, one scalar input (e.g., the first scalar input s0 of FIG. 15) and one weight (e.g., the first weight w0 of FIG. 15) will be only described with reference to FIG. 16. Configurations of the remaining weights and the remaining scalar inputs may be identical to configurations of the first weight w0 and the first scalar input s0.

Referring to FIGS. 5, 15, and 16, the first scalar input s0 may be broadcasted to each of the plurality of devices (FPU 0 to FPU 15) 551 included in the SIMD FPUs 550. That is, the same scalar input, that is, the first scalar input s0 may be selected by the plurality of multiplexers MUX 0 to MUX 15 based on the mux signal ms.

The first weight w0 may be input to the plurality of devices (FPU 0 to FPU 15) 551 from a memory bank. For example, the first weight w0 may include 8 element groups in the first direction. However, the number of element groups included in the first weight w0 is not limited thereto.

For example, the first element group may include the plurality of elements e1a to e1p in the first direction. As in the above description, the eighth element group may include the plurality of elements e8a to e8p in the first direction.

The first weight w0 stored in the memory bank may be read in the first direction. That is, the first element group may be read first of all. The eighth element group may be read finally.

Accordingly, an operation may be performed on the first element group first of all, and continue to each of the element groups until an operation may be finally performed on the eighth element group.

The first element e1a included in the first element group may be applied to the first device FPU 0. The second element e1b included in the first element group may be applied to the second device FPU 1. As in the above description, the 16th element e1p included in the first element group may be applied to the 16th device FPU 15.

The first device FPU 0 may perform the second operation based on the first element e1a included in the first element group and the first scalar input s0 thus broadcasted.

The second device FPU 1 may perform the second operation based on the second element e1b included in the first element group and the first scalar input s0 thus broadcasted.

As in the above description, the 16th device FPU 15 may perform the second operation based on the 16th element e1p included in the first element group and the first scalar input s0 thus broadcasted.

A result of performing the second operation on the first scalar input s0 and the first element group may be stored in the second vector register 560. In some embodiments, when data stored in the second vector register 560 exist, the SIMD FPUs 550 may perform the fourth operation based on the data output from the second vector register 560 and the result of the second operation.

The fourth operation may be the accumulate operation of each element included in the result of the second operation and each element included in the output data. In this case, the result of the fourth operation may be stored in the second vector register 560.

As in the above description, the first device FPU 0 may perform the second operation based on the first element e8a included in the eighth element group and the first scalar input s0 thus broadcasted.

The second device FPU 1 may perform the second operation based on the second element e8b included in the eighth element group and the first scalar input s0 thus broadcasted.

As in the above description, the 16th device FPU 15 may perform the second operation based on the 16th element e8P included in the eighth element group and the first scalar input s0 thus broadcasted.

A result of performing the second operation on the first scalar input s0 and the eighth element group may be stored in the second vector register 560. In some embodiments, when data stored in the second vector register 560 exist, the SIMD FPUs 550 may perform the fourth operation based on the data output from the second vector register 560 and the result of the second operation.

The fourth operation may be the accumulate operation of each element included in the result of the second operation and each element included in the output data. In this case, the result of the fourth operation may be stored in the second vector register 560.

According to the above description, the PIM unit 500 may generate a result of the final second PIM operation while repeatedly performing the second PIM operation on a scalar input of a non-zero value received in the second operation mode. The result of the final second PIM operation may be the first output vector.

Afterwards, the PIM unit 500 may output the first output vector stored in the first memory bank, bank 0, to the external host in response to a command and an address received from the external host.

In the second PIM operation, because all the elements included in one weight are arranged in one direction, the external host may not need to additionally perform an operation between a plurality of elements belonging to an element group. Accordingly, the amount of data communication between the memory device and the external host for the external host to perform an additional operation may decrease.

Figure 17:
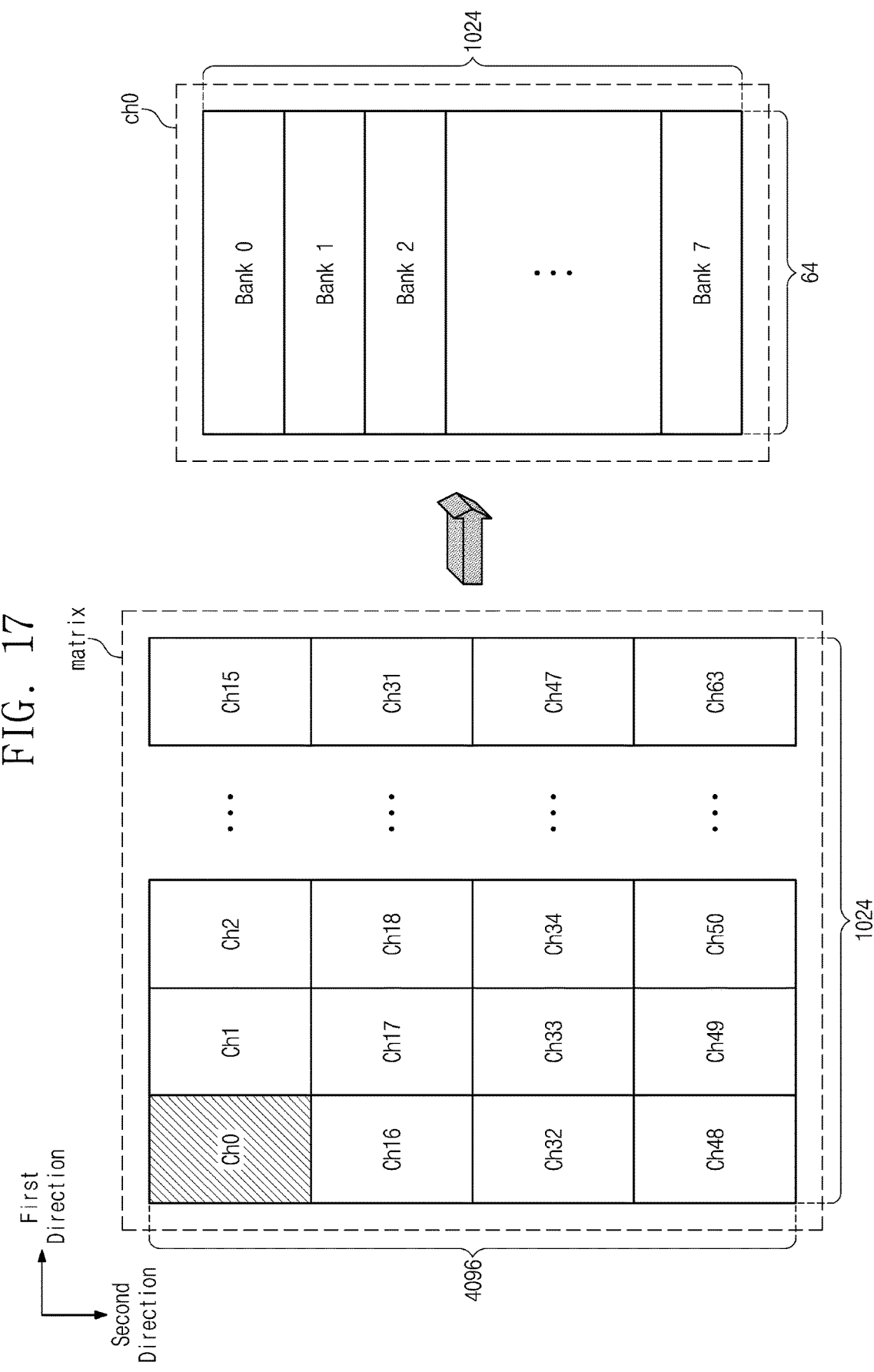
FIG. 17 is a diagram illustrating some embodiments in which one matrix is implemented with a plurality of channels.

FIG. 17 is a diagram illustrating some embodiments in which one matrix is implemented with a plurality of channels. In some embodiments, one matrix that is implemented with a plurality of memory banks connected to each of 64 channels ch0 to ch63 electrically connecting an external host and a memory device will be described with reference to FIG. 17. However, the number of channels is not limited thereto.

Referring to FIGS. 4, 5, and 17, in the matrix thus implemented, 16 channels may be disposed in the first direction, and 4 channels may be disposed in the second direction. Weights may be programmed in each of 8 memory banks, bank 0 to bank 7 connected to the first channel ch0. The weights may include a plurality of element groups, each of which includes a plurality of elements.

For example, in the second operation mode, a plurality of element groups may be programmed in the second direction for each of the 8 memory banks connected to the first channel ch0. As in the above description, in the second operation mode, weights may be programmed in the remaining channels ch1 to ch63.

Referring to FIGS. 4, 5, and 17, the number of the plurality of devices (FPU 0 to FPU 15) 551 included in the SIMD FPUs 550 may be "16". The description will be given under the assumption that the scalar register 430 is capable of storing 8 scalar inputs at the same time. However, the number of a plurality of devices and the size of the scalar register 430 are not limited thereto.

In some embodiments, 8 element groups (i.e., one weight) each including 16 elements may be programmed in the first memory bank, bank 0, belonging to the first channel ch0. According to the above description, 64 weights may be programmed in the first memory bank, bank 0, in the first direction. As in the above description, weights may be programmed in the remaining banks, bank 1 to bank 7.

In the memory banks, bank 0 to bank 7, connected to the first channel ch0, 64 elements may be programmed in the first direction, and 1024 elements may be programmed in the second direction. Accordingly, in one matrix, 1024 elements may be programmed in the first direction, and 4096 elements may be programmed in the second direction. However, the number of elements and the way to program the weights are not limited thereto.

The PIM unit 400/500 of FIGS. 4/5 may receive the scalar input from the external host. In this case, the PIM unit 400/500 may perform the second operation based on a scalar input of a non-zero value and a weight corresponding thereto. The PIM unit 400/500 may generate the first output vector as a result of the second PIM operation and may output the first output vector to the external host. According to the above manner, 8 output vectors (hereinafter referred to as an "output vector group") may be output to the external host through the first channel ch0.

When a weight corresponding to a scalar input of a non-zero value received from the external host is present in the first channel ch0, the 17th channel ch16, the 33th channel ch32, and the 49th channel ch48, the external host may perform the additional operation on the output vector group output through the first channel ch0, the output vector group output through the 17th channel ch16, the output vector group output through the 33th channel ch32, and the output vector group output through the 49th channel ch48.

Likewise, when a weight corresponding to a scalar input of a non-zero value received from the external host is present in the second channel ch1, the 18th channel ch17, the 34th channel ch33, and the 50th channel ch49, the external host may perform the additional operation on the output vector group output through the second channel ch1, the output vector group output through the 18th channel ch17, the output vector group output through the 34th channel ch33, and the output vector group output through the 50th channel ch49.

That is, the external host may perform the additional operation based on data output from channels including a plurality of memory banks where the same weights corresponding to a non-zero scalar input are programmed in the second direction.

Figure 18:
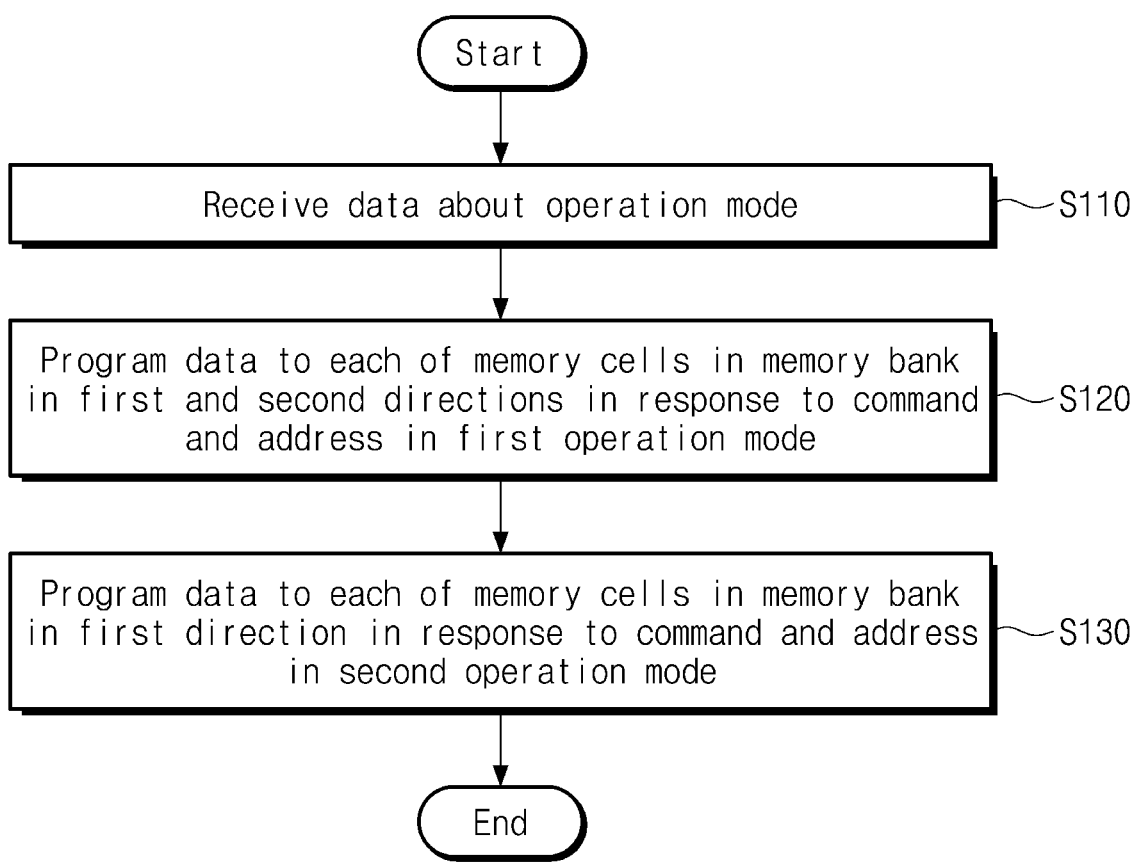
FIG. 18 is a flowchart of an operating method of a memory device where weights are differently programmed depending on an operation mode.

FIG. 18 is a flowchart of an operating method of a memory device where weights are differently programmed depending on an operation mode. Referring to FIGS. 2 and 18, in operation S110, the memory device 200 may receive data associated with an operation mode from the host 20. The operation mode may include the first PIM operation mode for a vector input and the second PIM operation mode for a scalar input.

When the received data include information about the first PIM operation mode, in operation S120, the memory device 200 may program weights at memory cells of a memory bank in the first direction and the second direction, based on a command and an address received from the host 20. The second direction may be a direction perpendicular to the first direction.

When the received data include information about the second PIM operation mode, in operation S130, the memory device 200 may program weights at memory cells of a memory bank in the first direction, based on a command and an address received from the host 20.

Figure 19:
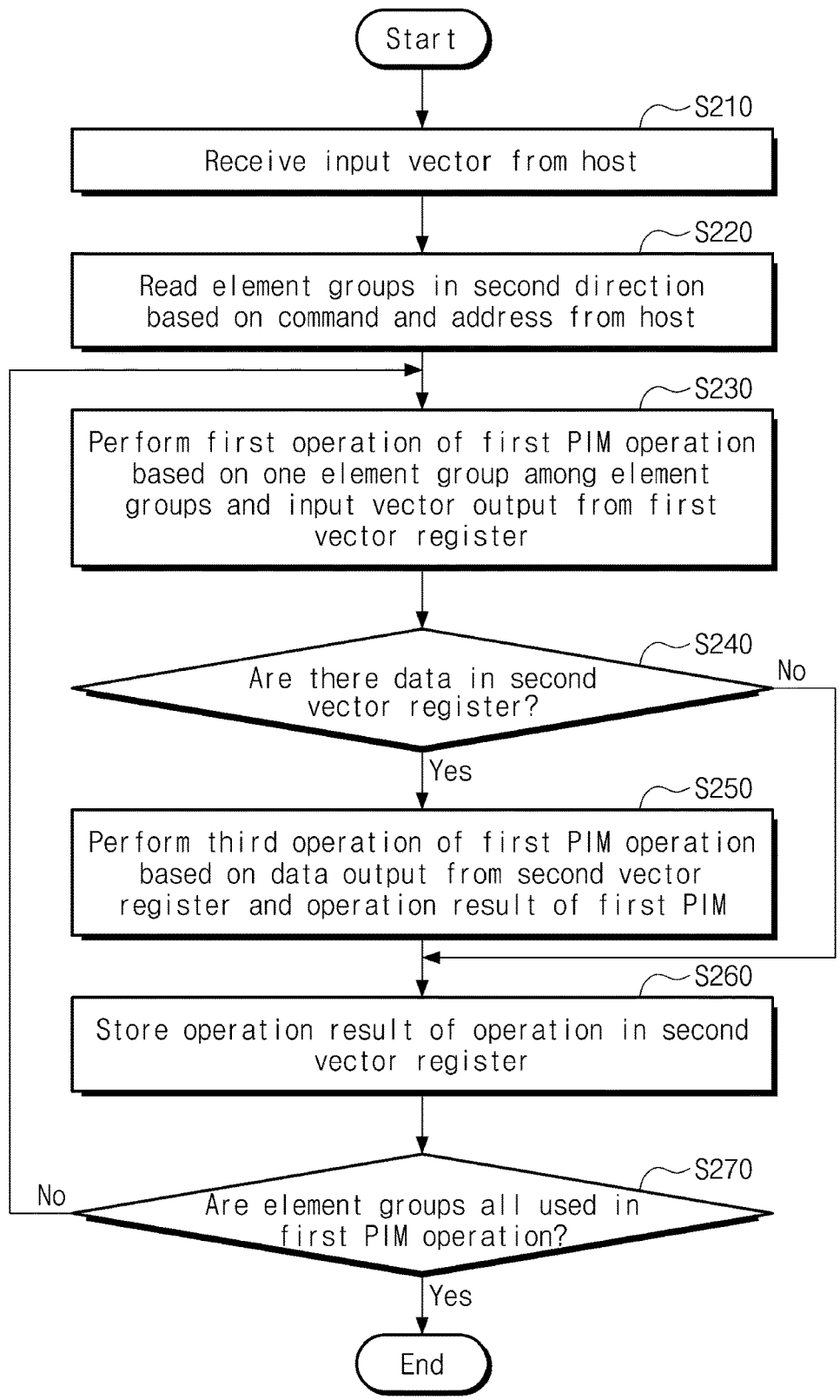
FIG. 19 is a flowchart of an operating method of a memory device performing a first PIM operation in a first operation mode.

FIG. 19 is a flowchart of an operating method of a memory device performing a first PIM operation in a first operation mode. Referring to FIGS. 2 and 19, in operation S210, the memory device 200 may receive a vector input from the host 20.

In operation S220, the memory device 200 may read current element groups in the second direction based on a command and an address received from the host 20.

In operation S230, the memory device 200 may perform the first operation of the first PIM operation based on the vector input currently received and one of the current element groups thus read.

When it is determined in operation S240 that data stored in the memory device 200 exist, operation S250 to operation S270 may be performed. The stored data may include a result of performing the previous first PIM operation based on a previous vector input and previously read element groups.

In operation S250, the memory device 200 may perform the third operation of the first PIM operation based on the result of the current first operation and the stored data.

In operation S260, the memory device 200 may store the result of the current third operation.

When it is determined in operation S270 that all the weights previously programmed in the memory device 200 and corresponding to the current vector input are used in the first PIM operation, the procedure ends.

When it is determined in operation S270 that at least one weight not used in the first PIM operation is present in the weights previously programmed in the memory device 200, operation S230 to operation S270 may be repeated. In this case, the memory device 200 may perform the next first PIM operation based on the current vector input and a next element group.

When it is determined in operation S240 that data stored in the memory device 200 do not exist, operation S260 and operation S270 may be performed.

In operation S260, the memory device 200 may store the result of the first operation without modification.

When it is determined in operation S270 that all the weights previously programmed in the memory device 200 and corresponding to the current vector input are used in the first PIM operation, the procedure ends.

When it is determined in operation S270 that at least one weight not used in the first PIM operation is present in the weights previously programmed in the memory device 200, operation S230 to operation S270 may be repeated. In this case, the memory device 200 may perform the next first PIM operation based on the current vector input and a next element group.

Figure 20:
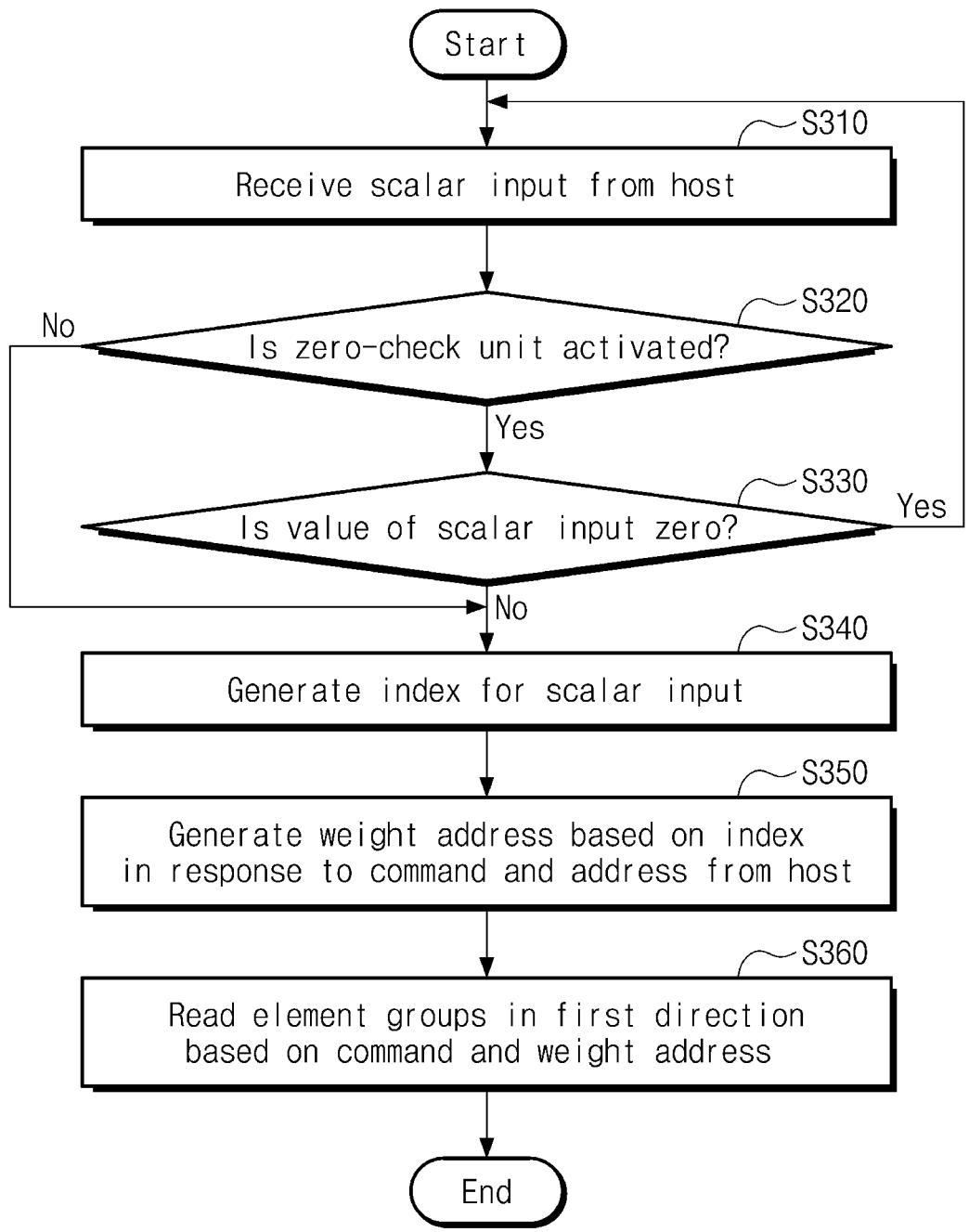
FIG. 20 is a flowchart of an operating method of a memory device for performing reading weights corresponding to a scalar input in a second operation mode.

FIG. 20 is a flowchart of an operating method of a memory device for performing reading weights corresponding to a scalar input in a second operation mode. Referring to FIGS. 2, 13, and 20, in operation S310, the memory device 200 may receive a scalar input from the host 20.

When it is determined in operation S320 that the zero-check unit 711 is activated, operation S330 to operation S360 may be performed.

When it is determined in operation S330 that a value of the scalar input is "0", operation S310 and operation S320 may be performed again.

When it is determined in operation S320 that the zero-check unit 711 is deactivated or when it is determined in operation S330 that the value of the scalar input is not "0", operation S340 to operation S360 may be performed.

In operation S340, the memory device 200 may generate an index corresponding to the scalar input.

In operation S350, the memory device 200 may generate a weight address, which is based on the index, in response to a command and an address received from the host 20.

In operation S360, the memory device 200 may read element groups programmed in the first direction in the second operation mode, based on the command and the weight address.

Figure 21:
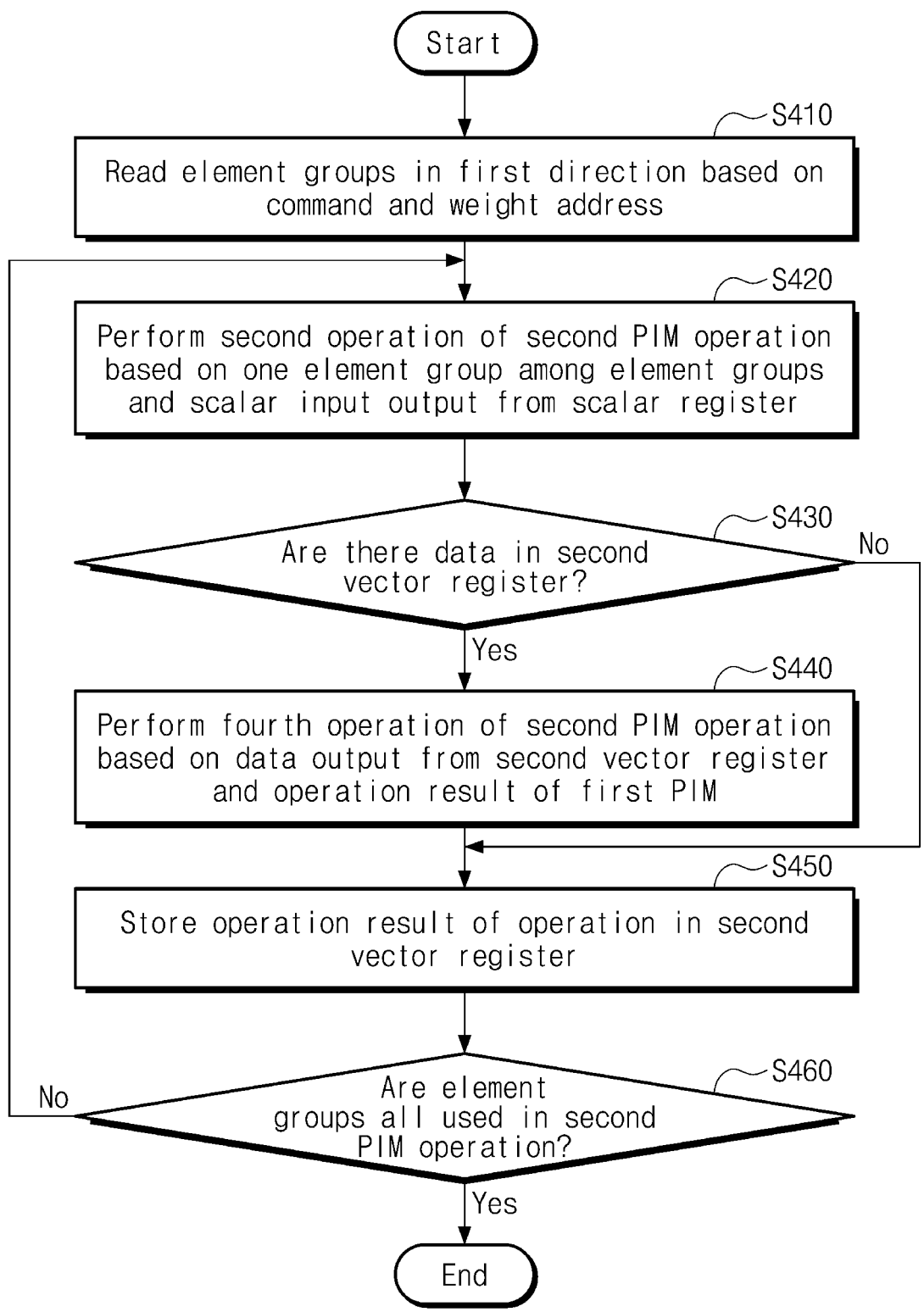
FIG. 21 a flowchart of an operating method of a memory device performing a second PIM operation in a second operation mode.

FIG. 21 a flowchart of an operating method of a memory device performing a second PIM operation in a second operation mode. Referring to FIGS. 2 and 21, in operation S410, the memory device 200 may read current element groups in the first direction based on a command and a weight address received from the host 20.

In operation S420, the memory device 200 may perform the second operation of the second PIM operation based on a current scalar input and one of the current element groups thus read.

When it is determined in operation S430 that data stored in the memory device 200 exist, operation S440 to operation S460 may be performed. The stored data may include a result of performing the previous second PIM operation based on a previous scalar input and previously read element groups.

In operation S440, the memory device 200 may perform the current fourth operation of the second PIM operation based on the result of the current second operation and the stored data.

In operation S450, the memory device 200 may store the result of the current fourth operation.

When it is determined in operation S460 that all the weights previously programmed in the memory device 200 and corresponding to the current scalar input are used in the second PIM operation, the procedure ends.

When it is determined in operation S460 that at least one weight not used in the second PIM operation is present in the weights previously programmed in the memory device 200, operation S420 to operation S460 may be repeated. In this case, the memory device 200 may perform the next second PIM operation based on the current scalar input and a next element group.

When it is determined in operation S430 that data stored in the memory device 200 do not exist, operation S450 and operation S460 may be performed. In operation S450, the memory device 200 may store the result of the second operation without modification.

When it is determined in operation S460 that all the weights previously programmed in the memory device 200 and corresponding to the current scalar input are used in the second PIM operation, the procedure ends.

When it is determined in operation S460 that at least one weight not used in the second PIM operation is present in the weights previously programmed in the memory device 200, operation S420 to operation S460 may be repeated. In this case, the memory device 200 may perform the next second PIM operation based on the current scalar input and a next element group.

According to some embodiments of the present disclosure, a memory device for a PIM operation and an operating method of the memory device may reduce the amount of data communication with a host by receiving a scalar input from the host instead of a vector input. Also, the memory device may not perform an operation on a zero value among values of a scalar input received from the host through a zero-check. Accordingly, power consumption of the memory device may be reduced, and the performance of processing of the memory device may be improved.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A memory device comprising:
a plurality of memory chips,
wherein each of the plurality of memory chips includes a plurality of memory banks,
wherein each of the plurality of memory banks includes:
   a memory cell array including a plurality of memory cells electrically connected to a plurality of word lines;
   a row decoder electrically connected to the memory cell array by the plurality of word lines; and
   a sense amplifier and write driver electrically connected to the memory cell array by a plurality of bit lines; and
a logic circuit electrically connected to the plurality of memory banks and configured to read or write data from or to the plurality of memory banks based on a plurality of respective commands and a plurality of respective addresses received from a host, the logic circuit comprising a multiplexer and a floating point unit circuit,
wherein, in a first operation mode, the logic circuit is configured to write first data in the plurality of memory banks based on a first command and a first address received from the host, and is configured to perform a first processing-in-memory (PIM) operation based on third data received from the host and the first data, and
wherein, in a second operation mode, the logic circuit is configured to write second data in the plurality of memory banks based on the first command and the first address received from the host, and is configured to perform a second PIM operation based on fourth data different from the third data received from the host and the second data, and
wherein the multiplexer is configured to transmit the third data or the fourth data to the floating point unit circuit.

2. The memory device of claim 1, wherein the first data includes a plurality of element groups, each of the plurality of element groups including a plurality of elements recorded at the plurality of memory banks in a first direction, and
wherein the plurality of element groups are recorded in a second direction perpendicular to the first direction,
wherein one of the first direction and the second direction comprises a row direction, and another one of the first direction and the second direction comprises a column direction in which the plurality of memory cells are arranged.

3. The memory device of claim 2, wherein, in the first operation mode, the logic circuit is configured to perform a first operation of the first PIM operation based on third data that is received and an element group among the plurality of element groups, and
wherein the element group is read in response to a second command and a second address received from the host.

4. The memory device of claim 3, wherein the logic circuit includes a vector register, and wherein, before performing the first operation, when data are absent from the vector register, the logic circuit is configured to store a result of the first operation in the vector register, and the logic circuit is configured to perform the first operation based on the third data that was received and a next element group read in the second direction in response to the second command and the second address that is received.

5. The memory device of claim 3, wherein the logic circuit includes a vector register,
wherein, after performing the first operation, when PIM data are present in the vector register, the logic circuit is configured to perform a second operation of the first PIM operation based on a result of the first operation and PIM data output from the vector register, and
wherein the PIM data include results of the first PIM operation performed based on third data previously received and a plurality of element groups read in response to a second command and a second address previously received.

6. The memory device of claim 5, wherein the logic circuit is configured to perform the first operation based on the third data that is received and a next element group read in the second direction based on the second command and the second address received, and
wherein the logic circuit is configured to perform a second operation of the first PIM operation based on the result of the first operation and PIM data subsequently output from the vector register.

7. The memory device of claim 1, wherein, in the second operation mode, when the fourth data include a non-zero value, the logic circuit is configured to generate an index based on the non-zero value of the fourth data, and
wherein the logic circuit is configured to generate a weight address based on the index in response to a second command and a second address received from the host.

8. The memory device of claim 7, wherein the second data include a plurality of element groups each including a plurality of elements recorded at the plurality of memory banks in a first direction that comprises a row direction or a column direction in which the plurality of memory cells are arranged, and
wherein the plurality of element groups are recorded in the first direction, and
wherein, in the second operation mode, the logic circuit is configured to perform a first operation of the second PIM operation based on fourth data received and an element group among the plurality of element groups, which is read in response to a second command and a weight address that are received.

9. The memory device of claim 8, wherein the logic circuit includes a vector register,
wherein, before performing the first operation, when data are absent from the vector register, the logic circuit is configured to store a result of the first operation in the vector register, and the logic circuit is configured to perform the first operation based on the fourth data and a next element group read in the first direction in response to the second command and the weight address received.

10. The memory device of claim 8, wherein the logic circuit includes a vector register,
wherein, after performing the first operation, when PIM data are present in the vector register, the logic circuit is configured to perform a second operation of the second PIM operation based on a result of the first operation and PIM data output from the vector register, and
wherein the PIM data include a result of the second PIM operation performed based on fourth data previously received and a plurality of element groups read in response to a second command and a weight address previously received.

11. The memory device of claim 10, wherein the logic circuit is configured to perform the first operation based on the fourth data and a next element group read in the first direction based on the second command and the weight address that was previously received, and
wherein the logic circuit is configured to perform a second operation of the second PIM operation based on the result of the first operation and PIM data subsequently output from the vector register.

12. The memory device of claim 1, wherein each of the first PIM operation and the second PIM operation includes a multiply-accumulate operation (MAC).

13. An operating method of a memory device which includes a plurality of memory chips each including a plurality of memory cells, the method comprising:
causing, in a first operation mode, a logic circuit included in the memory device to perform operations comprising:
recording first data at the plurality of memory cells based on a first command and a first address received from a host; and
performing a first PIM operation based on third data received from the host and the first data read based on a second command and a second address received from the host, wherein the third data is stored in a scalar register of the logic circuit, wherein the logic circuit comprises a multiplexer and a floating point unit circuit; and
causing, in a second operation mode, the logic circuit to perform operations comprising:
recording second data at the plurality of memory cells based on the first command and the first address;
generating an index when fourth data are received from the host, wherein the fourth data is stored in a vector register of the logic circuit;
transmitting, by the multiplexer, the third data or the fourth data to the floating point unit circuit;
generating a weight address based on the index in response to the second command and the second address; and
performing a second PIM operation based on the fourth data and the second data read in response to the second command and the weight address.

14. The method of claim 13, wherein the first data include a plurality of element groups each including a plurality of elements recorded at the plurality of memory cells in a first direction, the method further comprising:
in the first operation mode, the logic circuit performing a first operation of the first PIM operation on third data that is received and each of the plurality of element groups read in a second direction perpendicular to the first direction in response to a second address and a second command that are received, and
wherein one of the first direction and the second direction comprises a row direction, and another one of the first direction and the second direction comprises a column direction in which the plurality of memory cells are arranged.

15. The method of claim 14, further comprising:
causing, in the first operation mode, the logic circuit to perform a second operation of the first PIM operation on results of the first operation and each PIM data previously stored in the logic circuit,
wherein the PIM data include results of the first PIM operation performed based on third data previously received and the plurality of element groups read in response to a second command and a second address that were previously received.

16. The method of claim 13, wherein the second data include a plurality of element groups each including a plurality of elements recorded at the plurality of memory cells in a first direction, the method further comprising:
causing, in the second operation mode, the logic circuit to perform a first operation of the second PIM operation on the fourth data and each of the plurality of element groups read in the first direction in response to a second command and a weight address that are received.

17. The method of claim 16, further comprising:
causing, in the second operation mode, the logic circuit to perform a second operation of the second PIM operation on results of the first operation and each PIM data previously stored in the logic circuit,
wherein the PIM data include results of the second PIM operation performed based on fourth data previously received and the plurality of element groups read in the first direction in response to a second command and a weight address that were previously received.

18. An operating method of a memory device which includes a plurality of memory chips each including a plurality of memory cells, the method comprising:
causing, in a first operation mode, a logic circuit comprising a multiplexer and a floating point unit circuit and included in the memory device to perform operations comprising:
recording first data at the plurality of memory cells based on a first command and a first address received from a host; and
performing a first PIM operation based on third data received from the host and the first data read in response to a second command and a second address received from the host, and causing, in a second operation mode, the logic circuit to perform operations comprising:
recording second data at the plurality of memory cells based on the first command and the first address;
receiving fourth data from the host;
generating an index when the fourth data include a non-zero value;
transmitting, by the multiplexer, the third data or the fourth data to the floating point unit circuit;
generating a weight address based on the index in response to the second command and the second address; and
performing a second PIM operation based on the fourth data and the second data read in response to the second command and the weight address,
wherein the third data comprises scalar data and the fourth data comprises vector data.

19. The method of claim 18, wherein each of the first data and the second data includes a plurality of element groups each including a plurality of elements recorded at the plurality of memory cells in a first direction,
wherein the plurality of element groups included in the first data are read in a second direction perpendicular to the first direction in response to the second command and the second address, and
wherein the plurality of element groups included in the second data are read in the first direction in response to the second command and the weight address, and
wherein one of the first direction and the second direction comprises a row direction, and another one of the first direction and the second direction comprises a column direction in which the plurality of memory cells are arranged.

20. The method of claim 18, wherein each of the first PIM operation and the second PIM operation includes a multiply-accumulate operation (MAC).

* * * * *